(12) United States Patent
Cho

(10) Patent No.: US 10,547,051 B2
(45) Date of Patent: Jan. 28, 2020

(54) MULTI-PHASE STRUCTURED CATHODE ACTIVE MATERIAL FOR LITHIUM ION BATTERY

(71) Applicant: North Carolina Agricultural and Technical State University, Greensboro, NC (US)

(72) Inventor: Sungjin Cho, Greensboro, NC (US)

(73) Assignee: North Carolina Agricultural and Technical University, Greensboro, NC (US)

(*) Notice: Subject to any disclaimer, the term of this patent is extended or adjusted under 35 U.S.C. 154(b) by 287 days.

(21) Appl. No.: 15/512,970

(22) PCT Filed: Sep. 22, 2015

(86) PCT No.: PCT/US2015/051426
§ 371 (c)(1),
(2) Date: Mar. 21, 2017

(87) PCT Pub. No.: WO2016/049014
PCT Pub. Date: Mar. 31, 2016

(65) Prior Publication Data
US 2017/0250404 A1    Aug. 31, 2017

Related U.S. Application Data

(60) Provisional application No. 62/053,585, filed on Sep. 22, 2014.

(51) Int. Cl.
*H01M 4/36* (2006.01)
*H01M 4/505* (2010.01)
(Continued)

(52) U.S. Cl.
CPC .......... *H01M 4/366* (2013.01); *C01G 53/006* (2013.01); *C01G 53/42* (2013.01); *C01G 53/50* (2013.01);
(Continued)

(58) Field of Classification Search
CPC .... H01M 4/505; H01M 4/5254; H01M 4/485; H01M 4/366; H01M 10/052;
(Continued)

(56) References Cited

U.S. PATENT DOCUMENTS 6,623,890 B2 * 9/2003 Munakata .......... C01G 45/1228
429/224
7,771,877 B2    8/2010 Paulsen et al.
(Continued)

FOREIGN PATENT DOCUMENTS

| JP | 2008-0270086 | 11/2008 |
| JP | 2011-238416 | 11/2011 |
| WO | WO 2016/049014 A1 | 3/2016 |

OTHER PUBLICATIONS

Bruce et al., "Nanomaterials for Rechargeable Lithium Batteries," Angew. Chem. Int. Ed., vol. 47, pp. 2930-2946 (2008).
(Continued)

*Primary Examiner* — Amanda C. Walke
(74) *Attorney, Agent, or Firm* — Jenkins, Wilson, Taylor & Hunt, P.A.

(57) ABSTRACT

A lithium deficient cathode active material for lithium-ion batteries is described. More particularly, the lithium deficient cathode active material can have multiphase structures, including both a layered or hexagonal structure (e.g., having an R-3m space group) and a spinel structure (e.g., having a $Fd\text{-}m$ space group). Batteries including the cathode active material and methods of preparing the cathode active material are also described.

22 Claims, 13 Drawing Sheets

(51) Int. Cl.
  *H01M 4/525* (2010.01)
  *C01G 53/00* (2006.01)
  *H01M 10/052* (2010.01)
  *H01M 4/485* (2010.01)
  *H01M 10/0525* (2010.01)

(52) U.S. Cl.
  CPC .......... *H01M 4/485* (2013.01); *H01M 4/505* (2013.01); *H01M 4/525* (2013.01); *H01M 10/052* (2013.01); *H01M 10/0525* (2013.01)

(58) Field of Classification Search
  CPC ....... H01M 10/0525; H01M 2004/028; H01M 4/525; C01G 53/006; C01G 53/42; C01G 53/50
  USPC ........................................................ 429/322
  See application file for complete search history.

(56) References Cited

U.S. PATENT DOCUMENTS

| | | | | |
|---|---|---|---|---|
| 2008/0280205 | A1* | 11/2008 | Jiang | C01G 53/006 429/223 |
| 2013/0149609 | A1 | 6/2013 | Deng et al. | |
| 2014/0175329 | A1 | 6/2014 | De Palma et al. | |
| 2015/0093642 | A1 | 4/2015 | Hiratsuka | |
| 2015/0270548 | A1* | 9/2015 | Nesper | B82Y 30/00 428/408 |
| 2016/0006026 | A1* | 1/2016 | Paulsen | C01G 51/42 429/231.3 |
| 2016/0028074 | A1* | 1/2016 | Sugiura | H01M 4/364 429/223 |
| 2016/0036038 | A1* | 2/2016 | Kuriyama | H01M 4/131 429/158 |
| 2017/0040594 | A1* | 2/2017 | Yamaki | H01M 4/1315 |
| 2017/0179469 | A1* | 6/2017 | Jiang | H01M 4/0404 |
| 2017/0229707 | A1* | 8/2017 | Dahn | H01M 4/623 |

OTHER PUBLICATIONS

Cho et al., "A new type of protective surface layer for high-capacity Ni-based cathode materials: nanoscaled surface pillaring layer," Nano Lett., vol. 13, pp. 1145-1152 (2013).

Kim et al., "Unexpected high power performance of atomic layer deposition coated Li[Ni1/3Mn1/3Co1/3]O2 cathodes," Journal of Power Source, vol. 254, pp. 190-197 (Jan. 8, 2014).

Luo et al., "A New Spinel-Layered Li-Rich Microsphere as a High-Rate Cathode Material for Li-Ion Batteries," Advanced Energy Materials, vol. 4, No. 11, 140062 (pp. 1-9) (Apr. 3, 2014).

Notification Concerning Transmittal of International Preliminary Report on Patentability (Chapter I of the Patent Cooperation Treaty), corresponding to PCT/US2015/051426, dated Apr. 6, 2017.

Notification of Transmittal of the International Search Report and the Written Opinion of the International Searching Authority, or the Declaration, corresponding to PCT/US2015/051426, dated Dec. 31, 2015.

Wu et al., "Stable Nanostructured Cathode with Polycrystalline Li-Deficient Li0.28Co0.29Ni0.30Mn0.20)2 for Lithium Batteries," Nano Lett., No. 14, pp. 1281-1287 (Feb. 14, 2014)

Cho et al. (2011) Spinel-Layered Core-Shell Cathode Materials for Li-Ion Batteries. Adv. Energy Material 1:821-828.

Cho (Mar. 2015) Multiphase and Nanscale Structured Cathode Active Material for Lithium Ion Battery. 3M Non-tenuredFaculty Award: Research Proposal. 1-5.

Cho, (May 7, 2015) Nanotechnology-Driven Energy Storage Material and Device, slides from presentation to Lenovo. 3M Non-Tenured Faculty Award: Research Proposal. 1-8.

Chowdari et al. (2001) Cathodic Behavior of (Co, Ti, Mg)-doped LiNiO2. Solid State Ionics 140(1-2):55-62.

Hu et al. (2009) Cycle Life Improvement of ZrO2-coated Spherical LiNi1/3Co1/3Mn1/3O2 Cathode Material for Lithium Ion Batteries. J. Power Sources 188(2):564-569.

Kim et al. (2008) Air stable Al2O3-coated Li2NiO2 cathode additive as a surplus current consumer in a Li-ion cell. J. Mater. Chem. 18(48):5880-5887.

Liu et al. (2004) A comparative study of LiNi0.8Co0.2O2 cathode materials modified by lattice-doping and surface-coating. Solid State Ionics 166(3-4):317-325.

Oh et al. (2006) Electrochemical Characterization of Zirconium-doped LiNi0.8Co0.2O2 Cathode Materials and Investigations on Deterioration Mechanism, Electrochim. Acta 51(18):3637-3644.

Thackeray et al. (2007) Li2MnO3-stabilized LiMO2 (M = Mn, Ni, Co) electrodes for lithium-ion batteries. J. Mater. Chem. 17: 3112-3125.

Wu et al. (2013) Spinel/Layered Heterostructural Cathode Material for High-Capacity and High-Rate Li-Ion Batteries. Advanced Materials 13(25):3722-3726.

Xiang et al. (2006) Rheological Phase Synthesis and Electrochemical Properties of Mg-Doped LiNi0.8Co0.2O2 Cathode Materials for Lithium-Ion Battery. J. Electrochim. Acta 51(18):3637-3644.

* cited by examiner

MULTI-PHASE STRUCTURED CATHODE ACTIVE MATERIAL FOR LITHIUM ION BATTERY

RELATED APPLICATIONS

The presently disclosed subject matter claims the benefit of U.S. Provisional Patent Application Ser. No. 62/053,585, filed Sep. 22, 2014; the disclosure of which is incorporated herein by reference in its entirety.

TECHNICAL FIELD

The presently disclosed subject matter relates generally to cathode materials for lithium-ion batteries, to methods of preparing such cathode materials, and to batteries comprising such materials.

ABBREVIATIONS

° C.=degrees Celsius
μl=microliters
μm=micrometers
Ah=ampere-hour
Co=cobalt
DSC=differential scanning calorimetry
EDX=energy dispersive x-ray spectrometry
g=gram
ICP-OES=inductively coupled plasma optical emission spectrometry
J=Joules
Li=lithium
$Li_2CO_3$=lithium carbonate
LiOH=lithium hydroxide
mAh=milliampere-hour
mg=milligram
min=minutes
mm=millimeters
Mn=manganese
MP=multiphase
Ni=nickel
nm=nanometers
NMC=nickel-manganese-cobalt
RT=room temperature
SEM=scanning electron microscope
SL=layered structure
V=volts
W=watts

BACKGROUND

Cathode materials for lithium-ion batteries typically include layered compounds "$LiMO_2$," spinel compounds "$LiM_2O_4$," and olivine compounds "$LiMPO_4$." These layered and spinel compositions are some of the most widely used in lithium ion batteries.

Typically, in the structure of a layered compound having the general formula "$LiMO_2$," the oxygen anions form a close-packed fcc lattice and cations occupy the 6-coordinated octahedral crystal sites. In this configuration, the "$MO_2$" slabs and "Li" layers are alternately stacked.

Within the structure of a spinel compound having the general formula "$LiM_2O_4$," the metal cations generally occupy the octahedral sites, but ¼ of them are located in the "Li" layer, which means that ¼ of the sites in the transition metal layer are vacant. $Li^+$ ions occupy the tetrahedral sites in the Li layer that share 5 faces with the empty octahedral sites in the transition metal layer. Together the three-dimensional $MO_2$ host and the vacancies in the transition metal layer ensure that there are three-dimensional diffusion pathways for the lithium ions. When used in a lithium ion battery, spinel material generally has better rate capability than a layered oxide material, but this benefit is balanced by a lower capacity of the spinel material. This discrepancy, as well as the spinel material's capacity degradation at elevated temperature, is typically a drawback to the use of spinel material as a cathode material.

Accordingly, there is an ongoing need for new cathode materials for use in lithium ion batteries. Particularly, there is a need for additional cathode materials with increased thermal stability and good rate performance.

SUMMARY

In some embodiments, the presently disclosed subject matter provides a cathode active material for lithium-ion batteries comprising a compound having multiphase structures, wherein said compound has the formula:

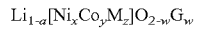

$$Li_{1-a}[Ni_xCo_yM_z]O_{2-w}G_w$$

wherein M is one or more elements selected from the group comprising Mn, Al, Mg, V, Cu, Zn, B, Zr, Ga, Fe, Ti, Cr, Sn, Sr, P, Ge, In, Cr and combinations thereof; a is between about 0.01 and about 0.5; each of x and y is between about 0.1 and about 0.8, z is between about 0.1 and about 0.5, and x+y+z=1.0; w is between 0 and about 0.3; G is selected from F, Cl, and I; and wherein said multiphase structures comprise a hexagonal structure with R-3m space group and a spinel structure with Fd-3m space group. In some embodiments, w is 0 and the compound has the formula:

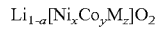

$$Li_{1-a}[Ni_xCo_yM_z]O_2$$

In some embodiments, M comprises Mn, optionally in combination with one or more of the group comprising Al, Mg, V, Cu, Zn, B, Zr, Ga, Fe, Ti, Cr, Sn, Sr, P, Ge, In, and Cr. In some embodiments, a is between about 0.01 and about 0.25 or is between about 0.11 and about 0.5.

In some embodiments, each of x and y is independently between about 0.2 and about 0.6. In some embodiments, x is between about 0.3 and about 0.8; y is between about 0.1 and about 0.4; and z is between about 0.1 and about 0.4. In some embodiments, each of x, y, and z is between about 0.30 and about 0.38; w is 0; M is Mn, and a is between about 0.01 and about 0.2.

In some embodiments, the presently disclosed subject matter provides a secondary particle comprising the cathode active material, wherein the secondary particle comprises a core and a surface layer, wherein the core comprises a plurality of core primary particles, wherein at least 50% of the core primary particles comprise material having a hexagonal structure with R-3m space group; and wherein the surface layer comprises a plurality of surface layer primary particles, wherein at least 50% of the surface layer primary particles comprise material having a spinel structure with Fd-3m space group. In some embodiments, the surface layer primary particles comprise a mixture of primary particles of material having a spinel structure and primary particles of material having a hexagonal structure. In some embodiments, the secondary particle has a diameter between about 1 μm and about 20 μm and wherein each core primary particle and each surface layer primary particle has a diameter below about 1 μm.

In some embodiments, the presently disclosed subject matter provides a battery comprising: a positive electrode containing a cathode active material comprising a compound having multiphase structures wherein the compound has the formula: $Li_{1-a}[Ni_xCo_yM_z]O_{2-w}G_w$; an electrolyte; and a negative electrode.

In some embodiments, the presently disclosed subject matter provides a method of preparing a cathode active material for a lithium-ion battery, wherein said material comprises a compound having multiphase structures, the method comprising: providing a metal-containing precursor having the formula:

$$Ni_xCo_yM_z(OH)_2$$

wherein M is one or more elements selected from the group comprising Mn, Al, Mg, V, Cu, Zn, B, Zr, Ga, Fe, Ti, Cr, Sn, Sr, P, Ge, In, Cr and combinations thereof, each of x and y is between about 0.1 and about 0.8, z is between about 0.1 and about 0.5, and x+y+z=1.0; mixing the metal-containing precursor with a lithium-containing salt, optionally $Li_2CO_3$, to provide a precursor mixture; heating the precursor mixture to between about 800° C. and about 1000° C. at a rate of between about 3° C. per minute and about 6° C. per minute to provide a heated mixture; and maintaining the heated mixture at between about 800° C. and about 1000° C. for a period of time between about 2 hours and about 10 hours, thereby providing a cathode active material having the formula:

$$Li_{1-a}[Ni_xCo_yM_z]O_2$$

wherein a is between about 0.01 and about 0.5; x, y, z, and M are as described for the metal-containing precursor; and wherein the multiphase structures comprise a hexagonal structure with R-3m space group and a spinel structure with Fd-3m space group.

In some embodiments, the method further comprises cooling the heated mixture to a temperature between about 20° C. and about 25° C. and grinding the cooled mixture, optionally wherein the grinding is performed manually and/or using a mortar and pestle.

In some embodiments, the presently disclosed subject matter provides a cathode active material prepared according to a method comprising: providing a metal-containing precursor having the formula:

$$Ni_xCo_yM_z(OH)_2$$

wherein M is one or more elements selected from the group comprising Mn, Al, Mg, V, Cu, Zn, B, Zr, Ga, Fe, Ti, Cr, Sn, Sr, P, Ge, In, Cr and combinations thereof, each of x and y is between about 0.1 and about 0.8, z is between about 0.1 and about 0.5, and x+y+z=1.0; mixing the metal-containing precursor with a lithium-containing salt, optionally $Li_2CO_3$, to provide a precursor mixture; heating the precursor mixture to between about 800° C. and about 1000° C. at a rate of between about 3° C. per minute and about 6° C. per minute to provide a heated mixture; and maintaining the heated mixture at between about 800° C. and about 1000° C. for a period of time between about 2 hours and about 10 hours.

It is an object of the presently disclosed subject matter to provide a cathode active material for lithium ion batteries having multiphase structures, batteries comprising the cathode active material, and methods for preparing the cathode active material.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

4.3V) of a layered structure cathode material (SL-NMC(1/ 1/1)) at 1C-rate and 45 degrees Celsius (° C.), where the voltage hold is applied at 4.3V until C/10 current rate after each charge step.

Figure 10:
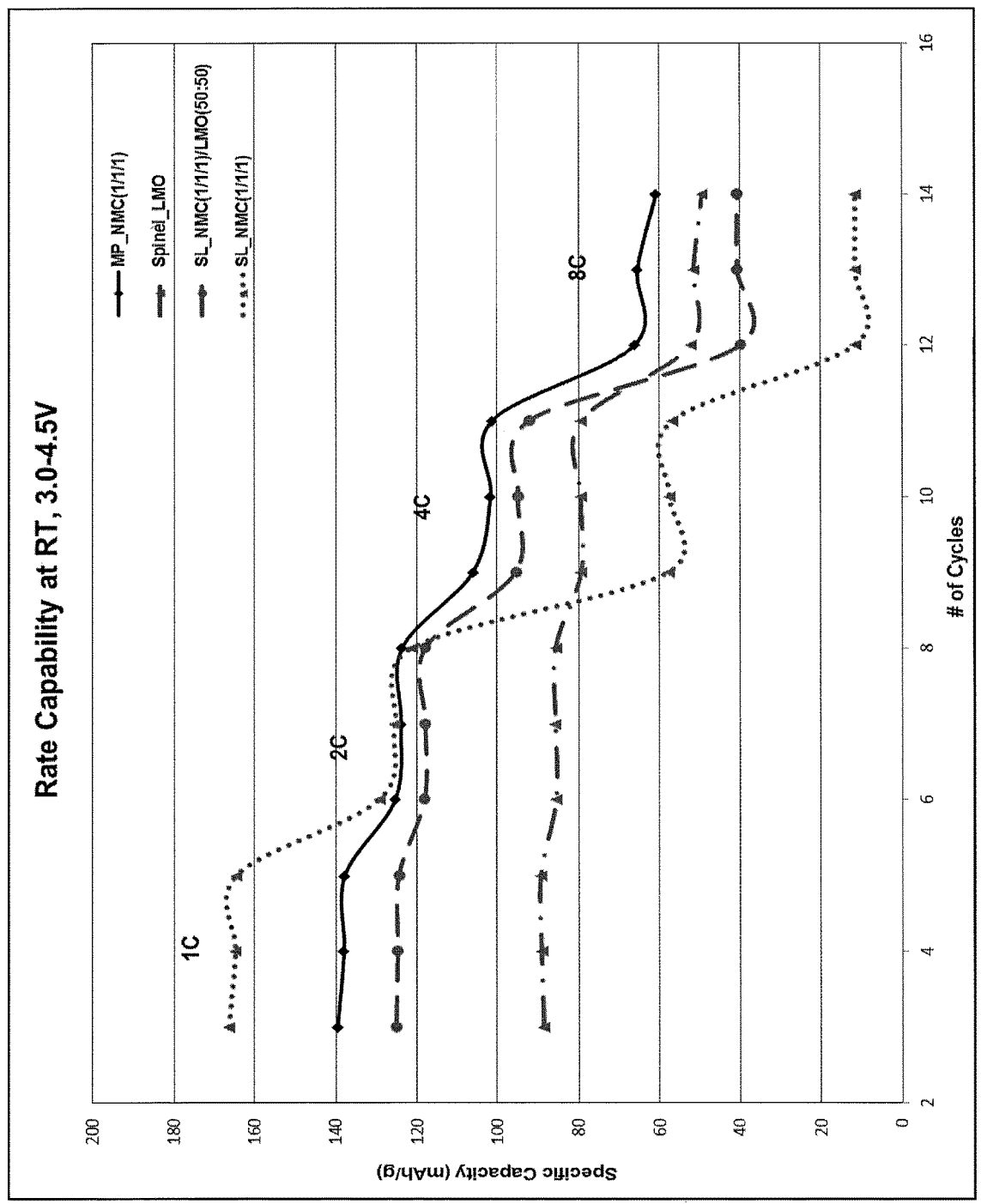

FIG. 10 is a graph of the rate capabilities at room temperature (3.0 Volts (V)-4.3V) of (a) a lithium deficient multiphase cathode material of the presently disclosed subject matter (MP NMC(1/1/1); solid line with diamonds), (b) $LiMn_2O_4$ having a spinel structure (Spinel-LMO; dashed and dotted line with triangles), (c) layered structure cathode material of the formula $LiNi_{1/3}Co_{1/3}Mn_{1/3}O_2$ (SL-NMC(1/ 1/1), dashed lined with circles) and (d) a blended mixture of $LiMn_2O_4$-spinel and layered structure ($LiNi_{1/3}Co_{1/3}Mn_{1/3}O_2$ (SL-NMC(1/1/1)/LMO (50:50); dotted line with triangles).

Figure 11:
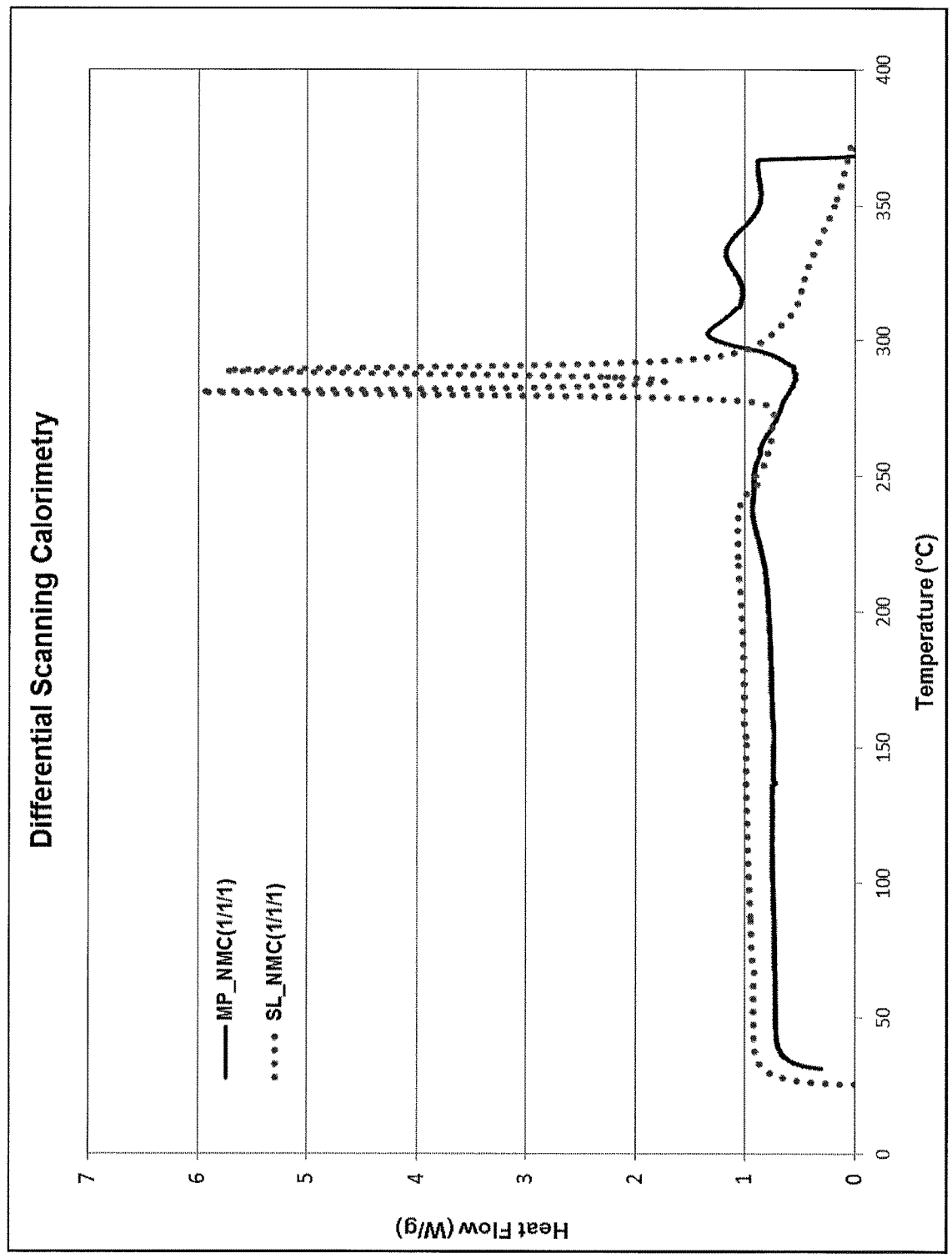

FIG. 11 is graph showing the differential scanning calorimetry (DSC) profiles of a sample comprising a lithium deficient multiphase cathode material of the presently disclosed subject matter (MP NMC(1/1/1); solid line) and a sample comprising a layered structure cathode material (SL NMC(1/1/1); dotted line) after charging at 4.5 Volts (V).

Figure 12:
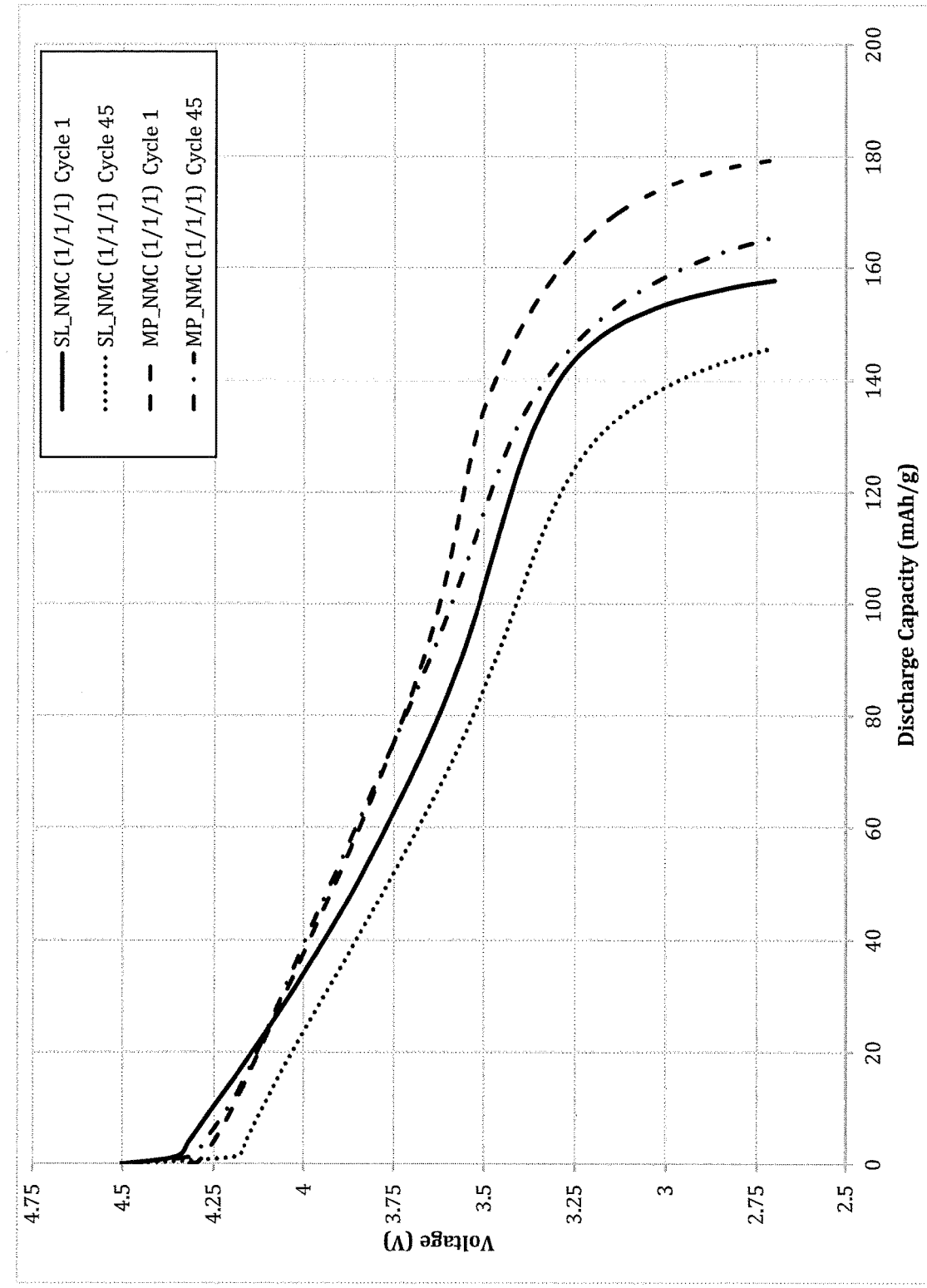

FIG. 12 is a graph of the first ($1^{st}$) and the forty-fifth ($45^{th}$) discharge capacity (2.7 Volts (V)-4.5V) of a layered structure cathode material (SL-NMC (1/1/1); solid line for $1^{st}$ discharge and dotted line for $45^{th}$ discharge) and of a lithium deficient multiphase cathode material of the presently disclosed subject matter (MP-NMC (1/1/1); dashed line for $1^{st}$ discharge and dashed and dotted line for $45^{th}$ discharge).

Figure 13:
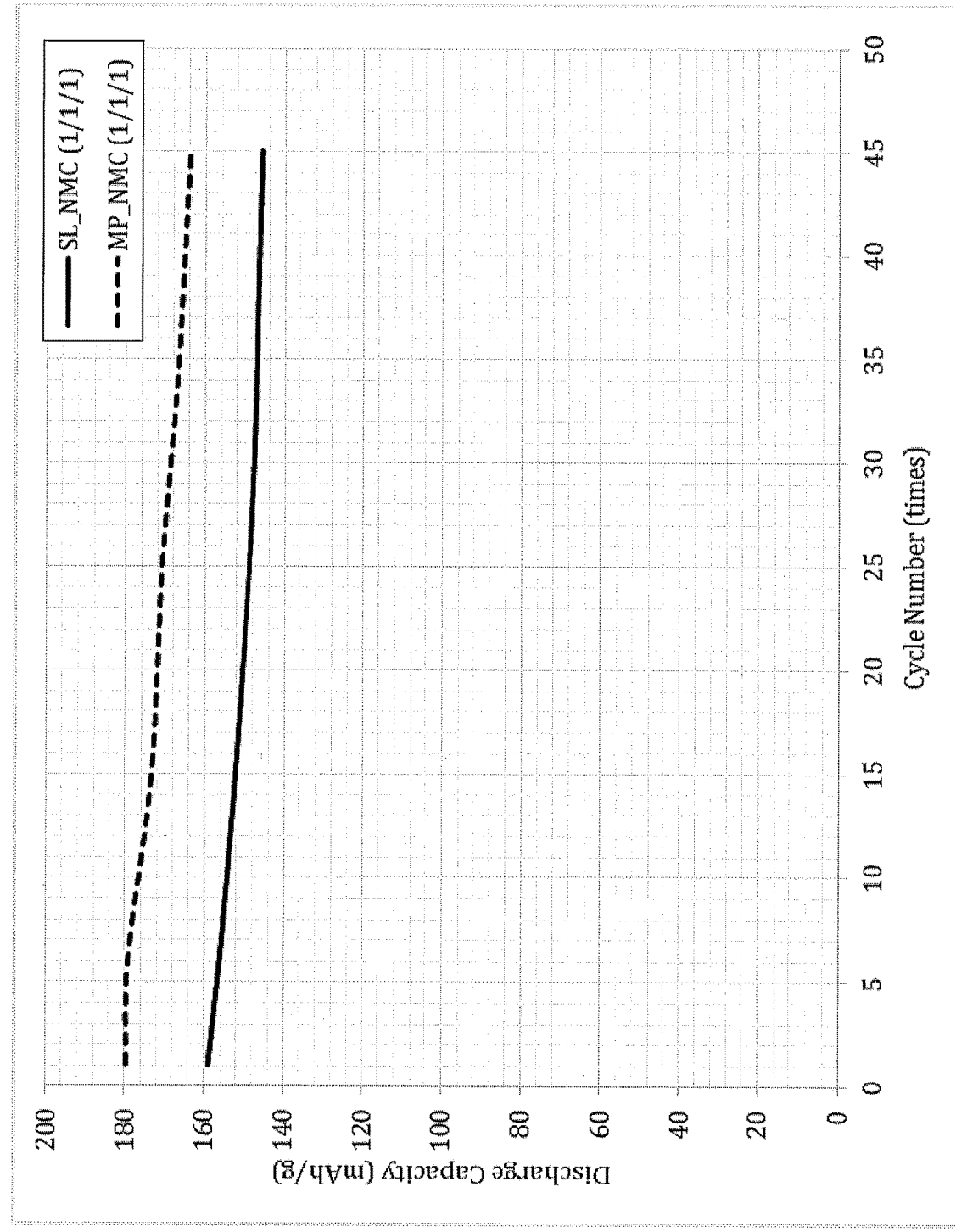

FIG. 13 is a graph of discharge capacity for a layered structure cathode material (SL-NMC (1/1/1); solid line) and a lithium deficient multiphase cathode material of the presently disclosed subject matter (MP-NMC (1/1/1); dashed line).

DETAILED DESCRIPTION

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used in the specification, the presently disclosed and claimed subject matter can include the use of either of the other two terms.

Unless otherwise indicated, all numbers expressing quantities of temperature, voltage, size, weight, capacity, percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

The term "primary particle" as used herein refers to a structure having at least one region with a dimension (e.g., length, width, diameter, etc.) of less than about 1 µm or generally of between about 1 µm and about 10 nm. In some embodiments, the dimension is smaller than about 1 µm (e.g., less than about 900 nm, less than about 800 nm, less than about 700 nm, less than about 600 nm, less than about 500 nm, less than about 400 nm, less than about 300 nm, less than about 200 nm, less than about 100 nm, less than about 50 nm, less than about 25 nm, or even less than about 10 nm).

The primary particle can have any shape. In some embodiments, the primary particle is approximately spherical. When the primary particle is approximately spherical, the characteristic dimension can correspond to the radius or diameter of the sphere. In addition to spherical shapes, the primary particle can be disc-shaped, oblong, polyhedral, rod-shaped, cubic, or irregularly-shaped.

The term "secondary particle" as used herein refers to a particle comprising a plurality of primary particles. The secondary particle can comprise a core region (i.e. an interior region of the secondary particle) and an outer surface layer (i.e., a layer that partially or completely surrounds the core region and which has a surface that is the outer surface of the secondary particle). In some embodiments, a secondary particle comprises at least one region with a dimension (e.g., length, width, diameter, etc.) of greater than about 1 μm or generally of between about 1 μm and about 50 μm or of between about 1 μm and about 20 μm. In some embodiments, the dimension is greater than about 1 μm (e.g., greater than about 2 μm, greater than about 3 μm, greater than about 4 μm, greater than about 5 μm, greater than about 6 μm, greater than about 7 μm, greater than about 8 μm, greater than about 9 μm, greater than about 10 μm, greater than about 12 μm, greater than about 14 μm, greater than about 16 μm, greater than about 18 μm, or even greater than about 20 μm).

As used herein, "NMC" refers to a composition comprising nickel, manganese, and cobalt. As used herein "NMC (1/1/1)" or "NMC 111" refers to a composition comprising about equimolar amounts of nickel, manganese, and cobalt. Generally the overall charge of NMC is +3 or greater.

As used herein, "SL NMC" refers to a NMC composition having a layered, or hexagonal structure (generally with an R-3m space group). Thus, SL NMC (1/1/1) is a layered structure component comprising about equimolar amounts of nickel, manganese and cobalt.

As used herein, "MP NMC" or "MPS NMC" refers to a multiphase NMC composition or a NMC composition with multiphase structures (i.e., having components or phases of more than one type of lattice or crystal structure). In some embodiments, the MP NMC comprises both layered and spinel structure space groups, in some embodiments R-3m and Fd-3m respectively. As disclosed herein in some embodiments, the multiphase compositions of the present application are also lithium deficient.

As used herein, "lithium deficient" refers to a composition in which the molar ratio of lithium to the cumulative total metal ($Ni_xCo_yM_z$) is less than 1:

$$\frac{Li}{Ni_xCo_yM_z} < 1$$

The term "electrochemical cell" refers to system that can generate electricity from chemical reactions or that can facilitate a chemical reaction using electrical energy. In some embodiments of the presently disclosed subject matter, electrochemical cells can include at least two electrodes and an electrolyte. The term "battery" refers to device that comprises one or more electrochemical cell or cells that can convert stored chemical energy into electrical energy.

The term "electrolyte" refers to a material that can conduct ions. Typically, electrolytes are liquids or solids (e.g., gels, polymers, or ceramics). Liquid electrolytes can be aqueous or non-aqueous (e.g., based on an organic solvent) and can further include one or more ion conducting salts. In some embodiments, the term "electrolyte" as used herein refers to a non-aqueous liquid electrolyte.

II. Cathode Active Materials and Methods of Preparing the Cathode Active Materials The presently disclosed subject matter provides, in some embodiments, a lithium deficient cathode active material that comprises multiphase structures. The multiphase structures can comprise both a layered or hexagonal structure (e.g., space group R-3m) and a spinel structure (e.g., space group Fd-3m). When used as a cathode active material, the composition demonstrates improved battery cycling at elevated temperature compared to conventional lithium-ion battery cathode active materials, as well as good rate performance and thermal stability.

In some embodiments, the cathode active material has a formula:

$$Li_{1-a}[Ni_xCo_yM_z]O_{2-w}G_w$$

wherein M is one or more elements selected from the group comprising Mn, Al, Mg, V, Cu, Zn, B, Zr, Ga, Fe, Ti, Cr, Sn, Sr, P, Ge, In, Cr and combinations thereof; a is between about 0.01 and about 0.5; each of x and y is between about 0.1 and about 0.8, z is between about 0.1 and about 0.5, and x+y+z=1.0; w is between 0 and about 0.3; and G is selected from the group comprising F, Cl, and I. Accordingly, the presently disclosed cathode active material can comprise a ratio of Li to other metals (Ni, Co, and M combined) that is between about 0.99 and about 0.5. In some embodiments, w is 0 and the compound has the formula:

$$Li_{1-a}[Ni_xCo_yM_z]O_2$$

In some embodiments, M comprises Mn, optionally in combination with one or more of the group comprising Al, Mg, V, Cu, Zn, B, Zr, Ga, Fe, Ti, Cr, Sn, Sr, P, Ge, In, Cr and combinations thereof. In some embodiments, the majority of the M content is Mn, while the other metals are present in minor or trace amounts (e.g., less than about 15, 10, 5, 4, 3, 2, or 1 molar % of M). In some embodiments, M comprises a majority of manganese and a trace amount of aluminum. In some embodiments, M is manganese.

In some embodiments, the upper limit of a is about 0.50, about 0.45, about 0.40, about 0.35, about 0.30, about 0.25, about 0.20, about 0.15, about 0.10, or about 0.05. In some embodiments, the lower limit of a is about 0.01, about 0.02, about 0.03, about 0.04, about 0.05, about 0.06, about 0.07, about 0.08, about 0.09, about 0.1, about 0.15, about 0.20, or about 0.25. In some embodiments, a is about 0.01, about 0.02, about 0.03, about 0.04, about 0.05, about 0.06, about 0.07, about 0.08, about 0.09, about 0.10, about 0.15, about 0.20, about 0.25, about 0.30, about 0.35, about 0.40, about 0.45, or about 0.50.

In some embodiments, a is between about 0.01 and about 0.25, or between about 0.01 and about 0.1, or between about 0.01 and about 0.05. In some embodiments, a is between about 0.02 and about 0.06 (i.e., is about 0.02, 0.03, 0.04, 0.05 or 0.06). In some embodiments, a is between about 0.11 and about 0.5, or between about 0.11 and about 0.25 (e.g., is about 0.11, 0.12, 0.13, 0.14, 0.15, 0.16, 0.17, 0.18, 0.19, 0.20, 0.21, 0.22, 0.23, 0.24, or 0.25).

In some embodiments, each of x and y is independently between about 0.1 and about 0.6, independently between about 0.2 and about 0.6, or each of x and y is independently between about 0.2 and about 0.5. In some embodiments, x is between about 0.3 and about 0.8; y is between about 0.1 and about 0.4; and z is between about 0.1 and about 0.4. In some embodiments, each of x, y, and z is independently between about 0.1 and about 0.5, or independently between about 0.2 and about 0.4 (e.g., is about 0.2, about 0.25, about 0.3, about 0.35, or about 0.40). In some embodiments, there is about equimolar amounts of Ni, Co, and M. In some embodiments, each of x, y and z is between about 0.30 and about 0.38. In some embodiments, each of x, y and z is about 0.33.

Figure 1:
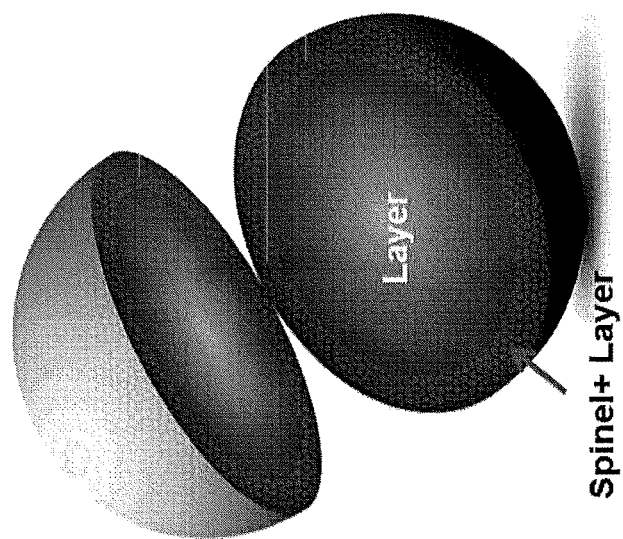
FIG. 1 is a schematic drawing of a cross sectional view of a secondary particle of a multiphase cathode material of the presently disclosed subject matter.

In some embodiments, the presently disclosed subject matter provides a particle comprising the cathode active material. In some embodiments, the core of the particle comprises cathode active material mainly having a layered structure, while the outer surface of the particle comprises a layer (i.e., a "surface layer") comprising cathode active material having a spinel structure or having a mixture of cathode active material having a spinel structure and cathode active material having a layered structure. See FIG. 1. Thus, in some embodiments, the surface layer of the particle comprises multiphase structures. In some variations, the multiphase structures comprise crystal structures of the R-3m and/or Fd-3m space groups.

Figure 2A:
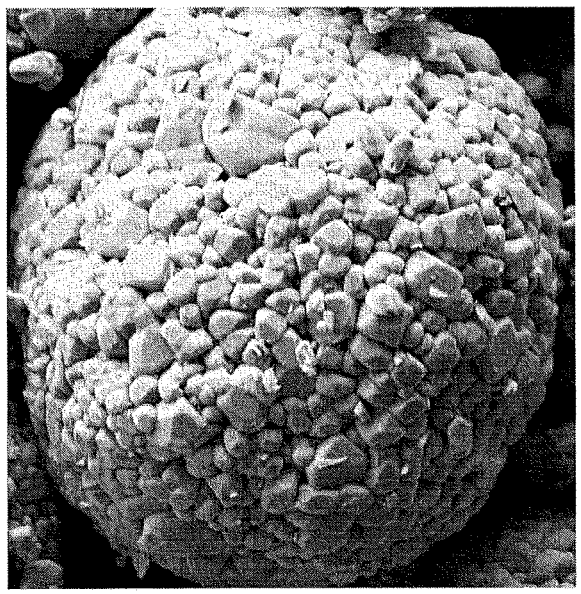
FIG. 2A is a scanning electron microscope (SEM) image showing the surface morphology of a monophase, layered structure nickel-manganese-cobalt formulation for a lithium ion cathode material having the formula: $Li_{1.08}Ni_{0.33}Mn_{0.33}Co_{0.33}O_2$ (SL NMC(1/1/1)).
Figure 2B:
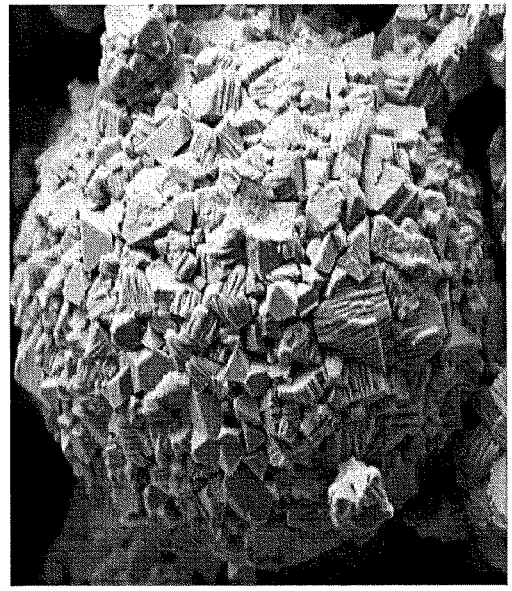
FIG. 2B is a scanning electron microscope (SEM) image showing the surface morphology of a lithium deficient multiphase (MP) cathode material of the presently disclosed subject matter, where the material has both layered (space group, R-3m) and spinel (space group, Fd-3m) phase structures.

In some embodiments, the particle comprising the cathode active material is a secondary particle comprising a plurality of primary particles. In some embodiments, the individual primary particles can be substantially monophasic, e.g., having cathode active material of either a layered structure or having a spinel structure. In some embodiments, the individual primary particles comprise about 80, 85, 90, 95, 96, 97, 98, 99 or 100% of material having the same lattice or crystal structure. In some embodiments, the secondary particle comprises a core and a surface layer wherein the core comprises a plurality of core primary particles, wherein at least 50% of the core primary particles comprise or consist of material have a layered structure (e.g., comprising a hexagonal phase with R-3m space group); and wherein the surface layer comprises a plurality of surface layer primary particles, wherein at least 50% of the surface layer primary particles comprise or consist of material having a spinel structure (e.g., comprising a space group Fd-3m). In some embodiments, the core primary particles are at least about 60, 70, 75, 80, 85, 90, 91, 92, 93, 94, 95, 96, 97, 98, 99, or about 100% primary particles of material having a layered structure. In some embodiments, the surface layer primary particles are at least 50% primary particles of material having a spinel structure and the remainder of the surface layer primary particles are of material having a layered structure. In some embodiments, the surface layer comprises at least about 55, 60, 65, 70, 75, 80, 85, or about 90% primary particles of material having a spinel structure. As shown in FIG. 2B, a secondary particle of the presently disclosed subject matter has a rougher surface compared to a particle comprising monophasic material having a layered lattice structure. See FIG. 2A. In a secondary particle of the presently disclosed subject matter, the surface primary particles of material having a spinel structure are well-crystallized. See FIG. 2B. The spinel phase components (e.g., of space group Fd-3m) generally appear as polyhedra, including but not limited to octahedra, hexahedra, and tetrahedra.

Figure 4:
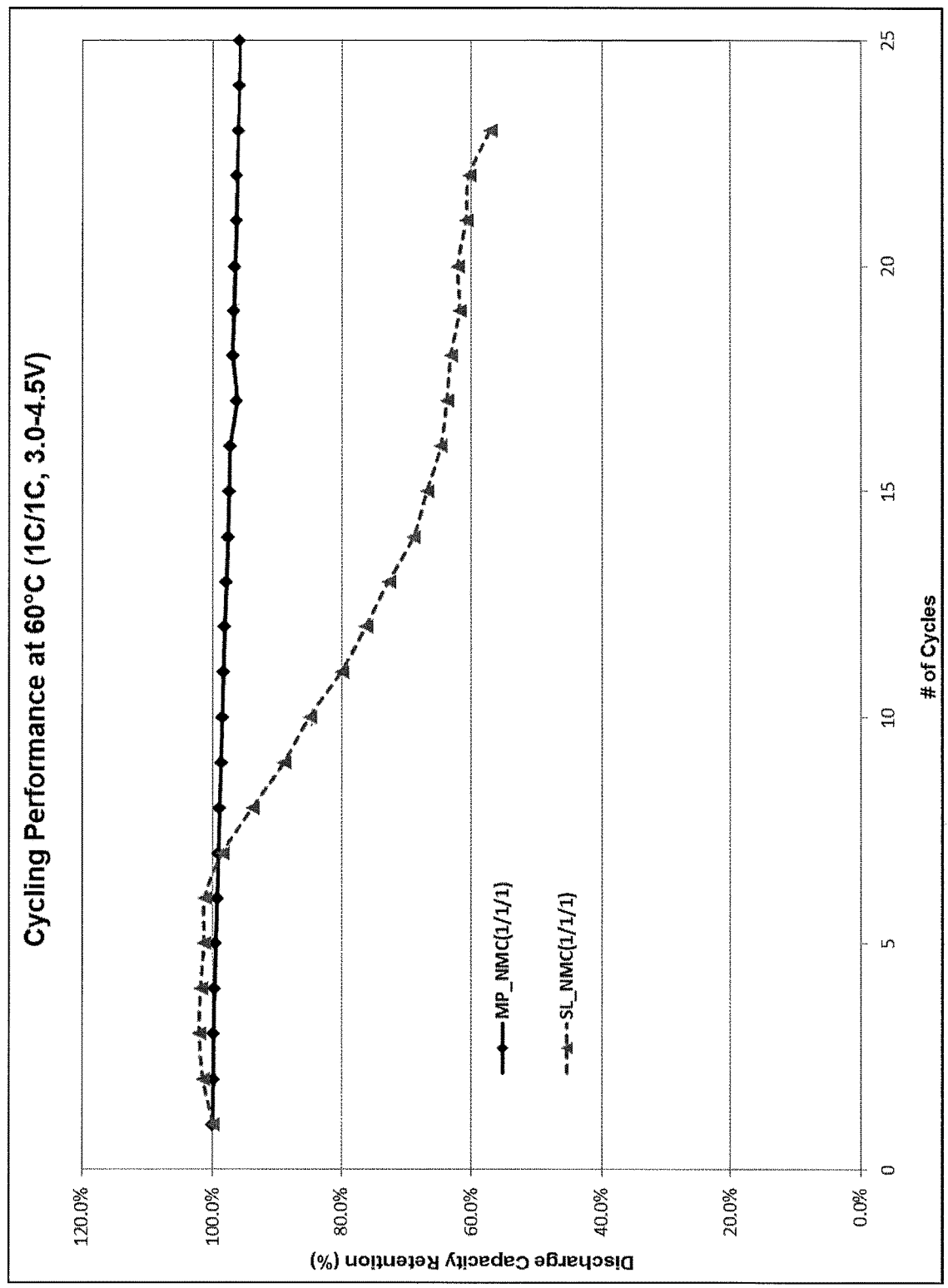
FIG. 4 is a graph of cycle performance for a lithium deficient multiphase cathode material of the presently disclosed subject matter (MP_NMC (1/1/1); solid line with diamonds) and a layered structure cathode material (SL_(NMC 1/1/1); dashed line with triangles) at 3.0 Volts (V)-4.5V versus Li$^+$/Li at 60 degrees Celsius (° C.) by applying a constant rate of 1C-rate during charge and discharge.
Figure 5:
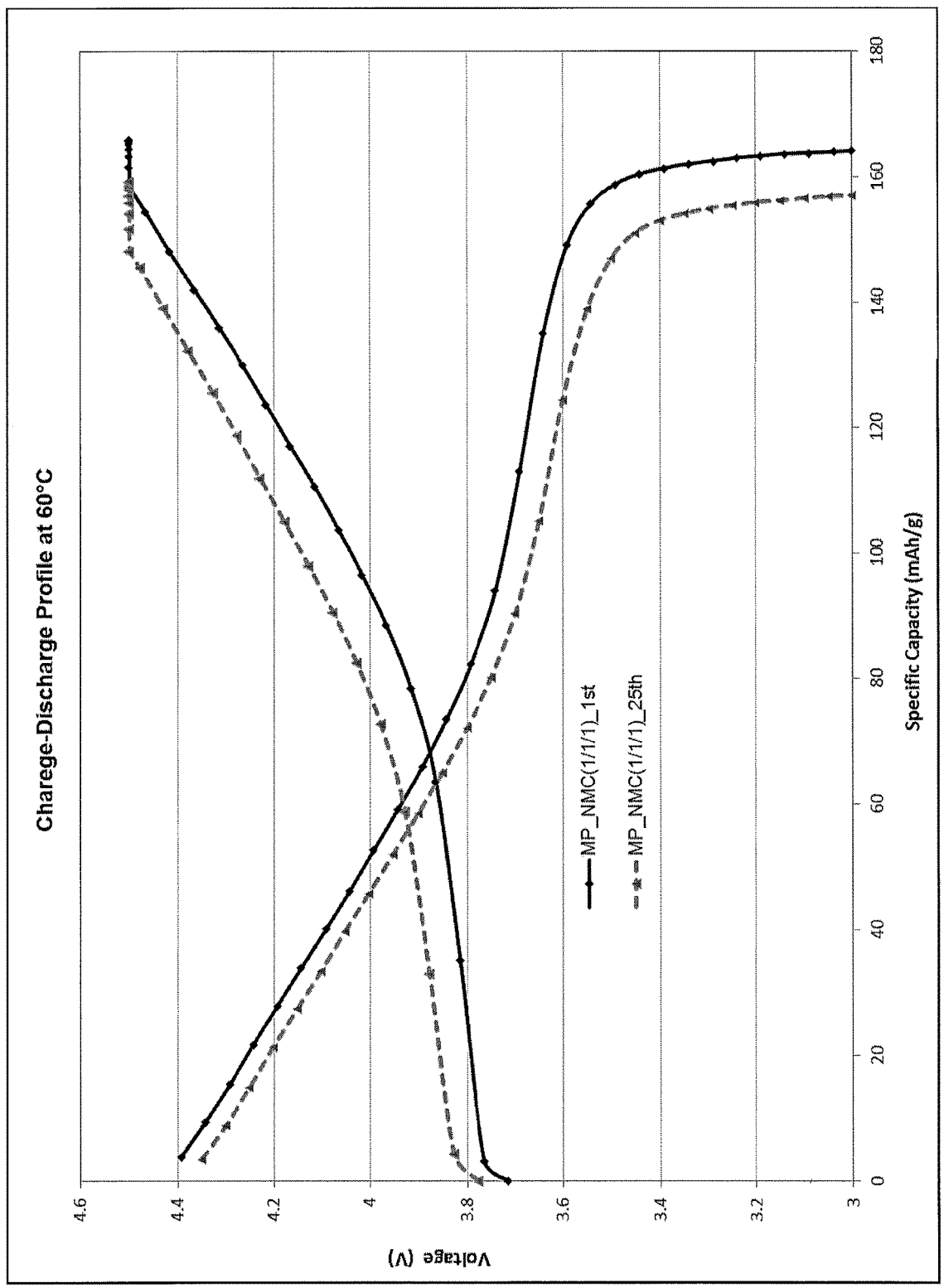
FIG. 5 is a graph of the first (1$^{st}$; solid line with diamonds) and the twenty-fifth (25$^{th}$; dashed line with triangles) charge-discharge voltage profiles (3.0 Volts (V)-4.5V) of a lithium deficient multiphase cathode material of the presently disclosed subject matter (MP NMC(1/1/1)) at 1C-rate and 60 degrees Celsius (° C.), where the voltage hold is applied at 4.5V until C/10 current rate after each charge step.
Figure 6:
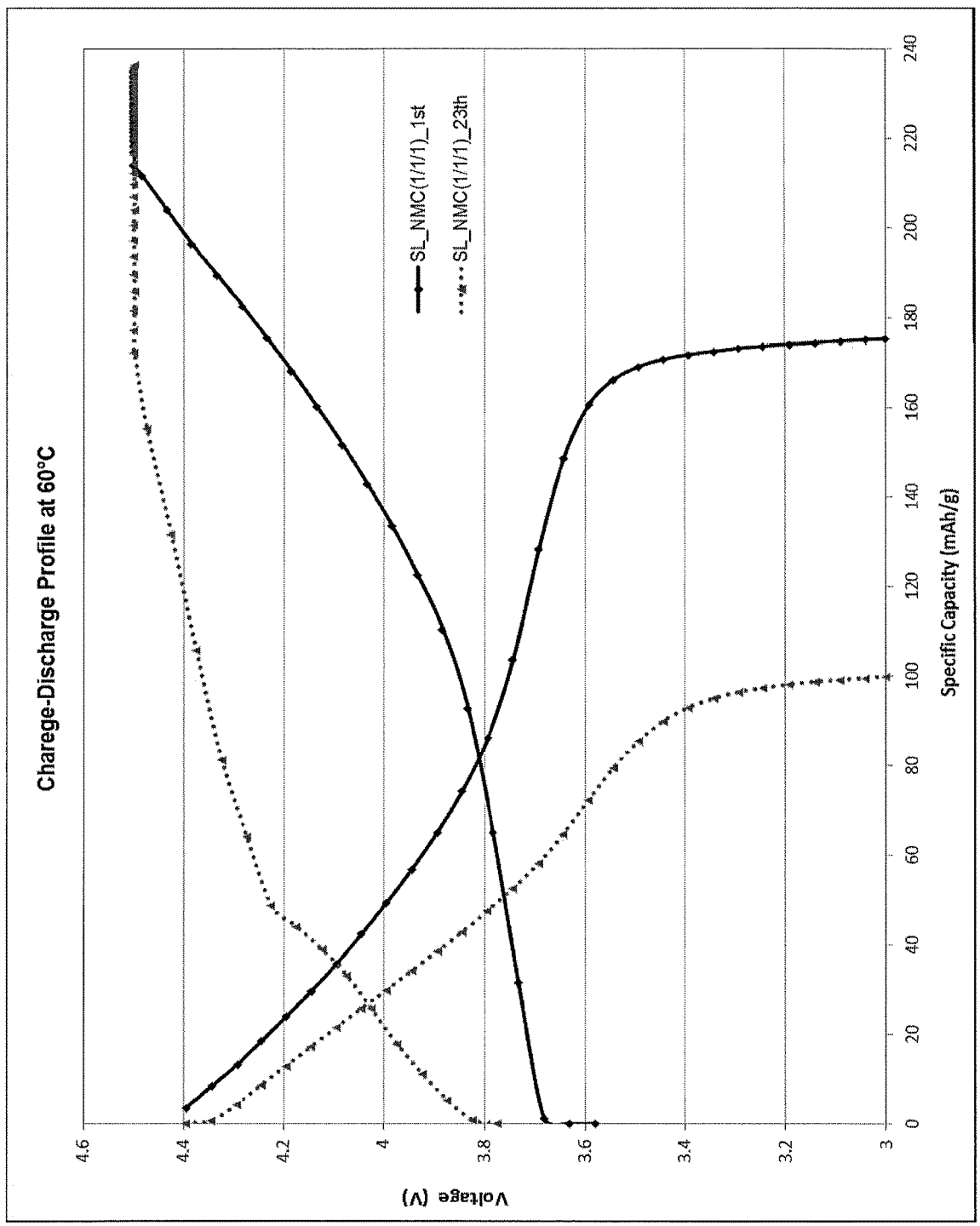
FIG. 6 is a graph of the first (1$^{st}$; solid line with diamonds) and the twenty-third (23$^{rd}$; dotted line with triangles) charge-discharge voltage profiles (3.0 volts (V)-4.5V) of a layered structure cathode material (SL NMC(1/1/1)) at 1C-rate and 60 degrees Celsius (° C.), where the voltage hold is applied at 4.5V until C/10 current rate after each charge step.

As described further hereinbelow, in some embodiments, the cathodic properties of the multiphase (MP) material of the presently disclosed subject matter indicate that the lithium deficient MP nickel-manganese-cobalt (NMC) material has a slightly lower initial capacity than a similar, but non-lithium deficient cathode active material having a conventional layered structure (SL NMC). Without being bound by any one theory, this is believed to be due to the lithium deficiency in the MP formulation. However, the MP material, due to its spinel components, is structurally more stable and durable than the conventional material having a layered structure. Thus the cycle performance of lithium deficient MP NMC (1/1/1) ($Li_{1-a}Ni_{0.33}Co_{0.33}Mn_{0.33}O_2$) can outperform SL NMC (1/1/1) cathode material having the formula $Li_{1.08}Ni_{0.33}Co_{0.33}Mn_{0.33}O_2$, as shown in FIG. 4. The specific capacity (mAh/g) of the lithium deficient MP NMC material also remains higher than the SL NMC material after several cycles. See FIGS. 5 and 6. Following these trends, it is believed that the lithium deficient MP material of the presently disclosed subject matter can provide more valuable capacity retention, as well as specific capacity, at the end of battery life.

As shown in FIG. 10, the lithium deficient MP NMC of the presently disclosed subject matter demonstrates superb rate performance compared to all other 'standard' cathode materials, including $LiMn_2O_4$ which has a spinel structure, as well as the $Li_{1.08}Ni_{0.33}Co_{0.33}Mn_{0.33}O_2$ layered oxide and the blended mixture (50:50, weight (wt) %) of the two components ($LiMn_2O_4$:$LiNi_{1/3}Co_{1/3}Mn_{1/3}O_2$), which is currently used in automotive lithium batteries for xEV (hybrid/plug-in hybrid/electronic vehicles) applications. Without being bound by any one theory, it is believed that the lithium deficient multiphase structures of the present application readily enable lithium intercalation and de-intercalation without loss of lithium, thereby demonstrating better effectiveness.

In some embodiments, the presently disclosed subject matter provides a method of preparing a cathode active material for a lithium-ion battery, wherein said material comprises a compound having multiphase structures. In some embodiments, the method comprises:

providing a metal-containing precursor having the formula:

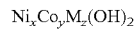

$$Ni_xCo_yM_z(OH)_2$$

wherein M is one or more elements selected from the group comprising Mn, Al, Mg, V, Cu, Zn, B, Zr, Ga, Fe, Ti, Cr, Sn, Sr, P, Ge, In, Cr and combinations thereof, each of x and y is between about 0.1 and about 0.8, z is between about 0.1 and about 0.5, and x+y+z=1.0; mixing the metal-containing precursor with a lithium salt, such as $Li_2CO_3$ or LiOH, to provide a precursor mixture; heating the mixture at a rate of between about 2° C. per minute and about 10° C. per minute or between about 2° C. per minute and about 8° C. per minute to a temperature of between about 800° C. and about 1000° C.; and holding the mixture at a highest temperature of between about 800° C. and about 1000° C. for up to about 10 hours.

In some embodiments, the method comprises: providing targeted stoichiometric amounts of metal-containing starting materials:

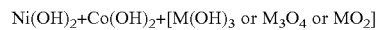

$$Ni(OH)_2+Co(OH)_2+[M(OH)_3 \text{ or } M_3O_4 \text{ or } MO_2]$$

wherein M is one or more elements selected from the group comprising Mn, Al, Mg, V, Cu, Zn, B, Zr, Ga, Fe, Ti, Cr, Sn, Sr, P, Ge, In, Cr and combinations thereof, each of x and y is between about 0.1 and about 0.8, z is between about 0.1 and about 0.5, and x+y+z=1.0; mixing the metal-containing starting materials in water and drying at between about 250° C. and about 350° C. for between about 2 and about 8 hours to form a metal-containing precursor, combining the metal-containing precursor with a lithium salt, such as $Li_2CO_3$ or LiOH, and optionally adding less than 5% by weight of a halide-containing salt, such as LiG, where G is F, Cl, or I, to provide a precursor mixture; heating the mixture at a rate of between about 2° C. per minute and about 8° C. per minute or between about 3° C. per minute and about 6° C. per minute, wherein the heating rate is controllably varied ±1° C. per minute, to a temperature of between about 800° C. and about 1000° C.; and holding the mixture at a highest temperature of between about 800° C. and about 1000° C. for up to about 10 hours.

In some embodiments, the method comprises heating the precursor mixture to between about 800° C. and about 1000°

C., at a rate of between about 3° C. per minute and about 6° C. per minute; and maintaining the mixture at about 800° C. and about 1000° C. for a period of time between about 2 hours and about 10 hours. In some embodiments, the period of time is between about 2 hours and about 8 hours (e.g., about 2, 2.5, 3, 3.5, 4, 4.5, 5, 5.5, 6, 6.5, 7, 7.5, or about 8 hours). In some embodiments, the period of time is between about 4 hours and about 6 hours.

In some embodiments, the method further comprises cooling the heated mixture to a temperature between about 20° C. and about 26° C. (or about 25° C.) and grinding the cooled mixture, optionally wherein the grinding is performed manually and/or using a mortar and pestle. In some embodiments, the heating and/or cooling can be performed in a furnace. In some embodiments, the cooling is performed by turning off the furnace after the period of time at the temperature between about 800° C. and about 1000° C. and allowing the compound to cool in situ in the furnace, as the furnace cools, e.g. cooling from about 1000° C. to about 25° C. in about 8 hours.

In some embodiments where LiG is used as a reactant, the method provides a multiphase structure cathode active material having the formula:

$$Li_{1-a}[Ni_xCo_yM_z]O_{2-w}G_w$$

wherein a is between about 0.01 and about 0.5; x, y, z, and M are as described above for the metal-containing precursor; w is between 0 and about 0.3; and G is F, Cl, or I; and wherein the multiphase structures comprise a layered or hexagonal structure (e.g., with R-3m space group) and a spinel structure (e.g., with Fd-3m space group). In some embodiments, the method provides a multiphase structure cathode active material having the formula:

$$Li_{1-a}[Ni_xCo_yM_z]O_2$$

wherein a is between about 0.01 and about 0.5; x, y, z, and M are as described above for the metal-containing precursor; and wherein the multiphase structures comprise a layered or hexagonal structure (e.g., with R-3m space group) and a spinel structure (e.g., with Fd-3m space group).

In some embodiments, the method provides a secondary particle of the cathode active material having a core and a surface layer as described hereinabove, i.e., wherein the core comprises mostly layered or hexagonal structured material and the surface layer comprises spinel or both spinel and layered or hexagonal structured material.

III. Electrochemical Cells, Cell Components, and Systems

In some embodiments, the presently disclosed subject matter provides a component of an electrochemical cell that comprises a multiphase (MP) lithium deficient cathode active material as described hereinabove. For example, the cell component can comprise a positive electrode comprising the MP cathode active material. The positive electrode can further comprise a positive electrode current collector and/or one or more binders and/or conductive agents.

The conductive agent can be used to enhance the electric conductivity of the cathode active material, while the binder can be used to keep particles of the cathode active material in sufficient contact with other particles of the cathode active material and/or with the conductive agent(s). The binder can also be used to keep the other positive electrode materials in contact with the surface of a positive electrode current collector. Examples of suitable conductive agents include, but are not limited to, carbon materials, such as carbon black, acetylene black, Ketjen black, carbon nanotubes, carbon nanofibers, mesoporous carbon, amorphous carbon, graphite (natural or artificial graphite), and mixtures thereof. Suitable binders include, but are not limited to, polymers such as polytetrafluoroethylene (PTFE), polyvinylidene fluoride (PVdF) and modified variations thereof. The binder can also be used in combination with water, carboxymethyl cellulose (CMC) or styrene butadiene rubber (SBR).

In some embodiments, the presently disclosed subject matter provides an electrochemical cell or a battery comprising a positive electrode comprising the MP lithium deficient cathode active material described hereinabove. In addition to the positive electrode, the cell or battery can further comprise a negative electrode and an electrolyte disposed between the positive and negative electrodes. Any suitable negative electrode can be used. For example, the negative electrode can be any negative electrode typically used for non-aqueous electrolyte secondary batteries. In some embodiments, the negative electrode can include a negative electrode current collector formed from a metal foil (e.g., a copper foil or other metal foil that is stable in a potential range of the negative electrode) or a similar material (e.g., a film having a surface layer formed of a metal stable in the potential range of the negative electrode) and a negative electrode active material layer formed on the negative electrode current collector.

The negative electrode active material can be any material into which lithium ions can be inserted and from which lithium ions can be extracted. Examples of suitable negative electrode active material include, but are not limited to, natural graphite, artificial graphite, lithium, silicon, carbon, tin, germanium, aluminum, lead, indium, gallium, lithium alloys, carbon and/or silicon into which lithium has already been inserted, and alloys and mixtures thereof. As described above for the positive electrode, the negative electrode can also include a binder, such as a fluorine-containing polymer (e.g., PTFE or PVdF), a rubber-based polymer, or the like. The binder can further be used in combination with a thickener (e.g., CMC or polyethylene oxide (PEO)). In some embodiments, the negative electrode can include a conductive material, such as the conductive agents described hereinabove for the positive electrode.

Any suitable electrolyte can be used. In some embodiments, the electrolyte is a non-aqueous electrolyte. The non-aqueous electrolyte can comprise a non-aqueous solvent and an electrolyte salt dissolved in the non-aqueous solvent. In addition to liquid electrolytes, the electrolyte can also be a solid electrolyte, comprising, for example, a gelled polymer.

As an electrolytic solution, for example, a non-aqueous (i.e., organic) electrolytic solution that contains a support electrolyte salt and an organic solvent can be used. The organic solvent is not particularly limited. Organic electrolytes can include cyclic ester carbonates, chain esters, carboxylic acid esters, cyclic ethers (e.g., crown ethers), chain ethers, nitriles, amides, halogen-substituted products, and mixtures thereof. For example, the organic electrolyte can include, but is not limited to, propylene carbonate (PC), ethylene carbonate (EC), vinylene carbonate, dimethyl carbonate (DMC), ethyl methyl carbonate (EMC), diethyl carbonate (DEC), methylpropyl carbonate, isopropiomethyl carbonate, ethyl propionate, methyl propionate, γ-butyrolactone (GBL), ethyl acetate, methyl acetate, tetrahydrofuran, 2-methyltetrahydrofuran, ethylene glycol dimethyl ether, ethylene glycol diethyl ether, acetonitrile (CAN), dimethyl sulfoxide (DMSO), diethoxyethane; dimethyl ether (DME), and tetraethylene glycol dimethyl ether (TEGDME).

Further, an ionic liquid can be used in or as an organic electrolytic solution. Suitable ionic liquids include, for example, but are not limited to, aliphatic quaternary ammonium salts such as N,N, N-trimethyl-N-propylammonium bis(trifluoromethanesulfonyl)amide (TMPA-TFSA], N-methyl-N-propylpiperidinium bis(trifluoromethane-sulfonyl)amide (PP13-TFSA), N-methyl-N-propylpyrrolidinium bis(trifluoromethanesulfonyl)-amide (P13-TFSA), N-methyl-N-butylpyrrolidinum bis(trifluoromethanesulfonyl)-amide (P14-TFSA), and N,N-diethyl-N-methyl-N-(2-methoxyethyl)ammonium bis(trifluoromethane-sulfonyl) amide (DEME-TFSA); and alkyl imidazolium quaternary salts such as 1-methyl-3-ethyl imidazolium tetrafluoroborate (EMIBF$_4$), 1-methyl-3-ethyl imidazolium bis(trifluoromethanesulfonyl)amide (EMITFSA), 1-allyl-3-ethyl imidazolium bromide (AEImBr), 1-allyl-3-ethyl imidazolium tetrafluoroborate (AEImBF$_4$), 1-allyl-3-ethyl imidazolium bis(trifluoromethanesulfonyl)amide (AEImTFSA), 1,3-diallyl imidazolium bromide (AAImBr), 1,3-diallyl imidazolium tetrafluoroborate (AAImBF$_4$), and 1,3-diallyl imidazolium bis(trifluoro-methanesulfonyl)amide (AAImTFSA). In some embodiments, the organic electrolyte comprises ACN, DMSO, DME, PP13-TFSA, P13-TFSA, P14-TFSA, TMPA-TFSA and/or DEME-TFSA.

Electrolyte gels can be obtained by gelating the electrolytic solutions described above. For example, as a method of gelating a non-aqueous electrolytic solution, a polymer such as polyethylene oxide (PEO), polyacrylonitrile (PAN), polyvinylidene fluoride (PVdF) or polymethyl methacrylate (PMMA) can be added to a non-aqueous electrolyte solution. An electrolyte gel can be formed, for example, in such a manner that, after the polymer and the electrolytic solution, which were described above, are mixed, the mixture is coated by casting on a base material and dried, the dried mixture is peeled off the base material, and cut into pieces as required.

The non-aqueous electrolyte can further include an additive, for example, for forming a film on the positive and negative electrodes. Suitable additives include, but are not limited to, vinylene carbonate (VC), ethylene sulfite (ES), cyclohexylbenzene (CHB), and modified substances thereof.

The electrolyte salt can be, for example, a lithium salt typically used in non-aqueous electrolyte secondary batteries. Examples of such salts include, but are not limited to, LiPF$_6$, LiBF$_4$, LiAsF$_6$, LiClO$_4$, LiCF$_3$SO$_3$, LiN(FSO$_2$)$_2$, LiN(C$_l$F$_{2l+1}$SO$_2$)(CmF2$_{m+1}$SO$_2$) (l and m represent an integer of 1 or more), LiC(C$_p$F$_{2p+1}$SO$_2$)(C$_q$F$_{2q+1}$SO$_2$)(C$_{2r+1}$SO$_2$) (p, q, and r represent an integer of 1 or more), Li[B(C$_2$O$_4$)$_2$], Li[B(C$_2$O$_4$)F$_2$], Li[P(C$_2$O$_4$)F$_4$] and Li[P(C$_2$O$_4$)$_2$F$_2$]. These lithium salts can be used alone or in combinations.

Solid electrolytes can also include, for example, LISICON (i.e., lithium super ionic conductor) oxides represented by Li$_a$X$_b$Y$_c$P$_d$O$_e$ (wherein X represents at least one kind selected from the group of B, Al, Ga, In, C, Si, Ge, Sn, Sb and Se; Y represents at least one kind selected from the group of Ti, Zr, Ge, In, Ga, Sn and Al; and a to e satisfy relationships of $0.5 < a < 5.0$, $0 \le b < 2.98$, $0.5 \le c < 3.0$, $0.02 < d \le 3.0$, $2.0 < b+d < 4.0$, and $3.0 < e12.0$); perovskite oxides such as Li$_x$La$_{1-x}$TiO$_3$; LISICON oxides such as Li$_4$XO$_4$—Li$_3$YO$_4$ (wherein X represents at least one kind selected from Si, Ge and Ti, and Y represents at least one kind selected from P, As and V) and Li$_3$DO$_3$-Li$_3$YO$_4$ (wherein D represents B, Y represents at least one kind selected from P, As and V); and garnet oxides of Li—La—Zr—O based oxides such as Li$_7$La$_3$Zr$_2$O$_{12}$ can be used. The solid electrolyte can be molded, for example, by rolling, or by preparing a slurry by mixing with a solvent, by coating, and by drying.

In some embodiments, the cell or battery can further comprise a separator. Suitable separators can include, porous materials having ion permeability and an insulating property. As the materials of the separator, for example, insulating resins, such as polyolefins including polyethylene (PE) and polypropylene (PP) as well as trilayers thereof, such as PP/PE/PP, and glasses can be used. Further, as a porous structure of the separator, for example, a mesh structure (or woven fabric) where structural fibers are regularly arranged, a nonwoven fabric structure where structural fibers are arranged at random, and a three-dimensional network structure having independent pores or coupling holes can be used.

Examples of materials for the current collectors include, but are not limited to, metals, such as stainless steel, nickel, aluminum, iron, titanium, and copper; carbon materials, such as carbon fiber, carbon cloth, and carbon paper; and ceramic materials having high electron conductivity, such as titanium nitride.

In some embodiments, the electrodes and electrolyte (and separator, if used) can be included in a battery case, which can be prepared from any suitable material for keeping moisture away from the battery or cell components. In some embodiments, the battery case can serve as a current collector. The shape of the battery case is not particularly limited. For example, a coin shape, a flat plate shape, a cylindrical shape, a pouch shape, and a prismatic shape can be used. In some embodiments, the battery case is cylindrical and the battery components can have a jelly roll configuration (e.g., a configuration comprising layers of positive electrode, separator, negative electrode, and separator rolled into a single spool and further comprising the electrolyte).

The presently disclosed batteries can find use, for example, as batteries for vehicles, power tools, and in consumer electronics. For example, the batteries can be used in electric and hybrid cars; radio-controlled cars, trains, and aircraft; digital cameras; camcorders; smartphones and other mobile phones; laptop computers; tablet computers; flashlights; and the like.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Synthesis of Multiphase Lithium Deficient Cathode Active Materials

General Synthesis of MP Lithium Deficient Materials:

MP lithium deficient materials were synthesized by direct sintering of the metal-containing precursors, followed by in situ cooling.

Generally, the metal containing precursor is prepared by dissolving targeted stoichiometric amounts of Co(OH)$_2$, Ni(OH)$_2$ and "M", typically manganese as Mn$_3$O$_4$, γ-MnO$_2$ or MnO$_2$, in distilled water. The metal precursor material (e.g. $Ni_xMn_yCo_z(OH)_2$) was collected after mixing the starting material solutions and drying the reaction solution at about 300° C. for about 5 hours. The precursor material was then mixed with appropriate stoichiometric amounts of a lithium salt, such as $Li_2CO_3$ or LiOH, and the mixture shaken for 10 minutes. The mixture was put in an electric furnace, which was heated to between about 800° C. and about 1000° C. at a rate of between about 2° C./min and about 10° C./min, which was controllably varied by ±1° C. per minute. The mixture was held at between about 800° C. and about 1000° C. for between about 2 hours and about 8 hours or between about 3 and about 6 hours. The furnace was then turned off and the sample was permitted to cool inside the furnace (e.g. cooling from about 1000° C. to about 25° C. took about 8 hours). After reaching room temperature, the resulting MP lithium deficient materials (e.g., MP NMC) was collected, ground by hand using a mortar/pestle for 10 minutes, and then stored.

Synthesis of MP_NMC (1/1/1) Variation 1:

In one synthesis, 1.48 g of NMC (1/1/1) precursor ($Ni_{0.33}Mn_{0.33}Co_{0.33}(OH)_2$ having a molecular weight (MW) of 90.93 g/mol) was mixed with 0.546 g of $Li_2CO_3$ (MW 73.89 g/mol) and the mixture was shaken by hand for 10 minutes. The mixture was then put in an electric furnace and the furnace was heated to about 1000° C. at a rate of between about 3° C./min and about 6° C./min where the heating rate varied ±1° C./minute. The mixture was held at about 1000° C. for about 4 hours. The furnace was then turned off and, after reaching room temperature, the resulting material [$Li_{0.9}(Ni_{0.33}Mn_{0.33}Co_{0.33})O_2$] was collected, ground by hand using a mortar/pestle for 10 minutes, and then stored.

Synthesis of MP_NMC (1/1/1) Variation 2:

In another synthesis, $Ni_{0.33}Mn_{0.33}Co_{0.33}(OH)_2$ was prepared as described above, mixed with a targeted stoichiometric amount of $Li_2CO_3$ and the mixture was shaken for about 10 minutes. The reaction mixture was then put in an electric furnace, which was heated to about 800° C. at a rate of between about 3° C./min and about 6° C./min where the heating rate was varied ±1° C./minute. The mixture was held at about 800° C. for about 6 hours. The furnace was then turned off and after reaching room temperature, the resulting material (MP NMC (1/1/1)) was collected, ground by hand using a mortar/pestle for 10 minutes, and then stored.

Synthesis of MP_NMC (1/1/1) Variation 3:

In another synthesis, $Ni_{0.33}Mn_{0.33}Co_{0.33}(OH)_2$ was prepared as described above, mixed with a targeted stoichiometric amount of $Li_2CO_3$ and shaken for 10 minutes. The reaction mixture was then put in an electric furnace, which was heated to about 450° C. at a rate of about 5° C./minute, then heated to about 1000° C. at a rate of about 4° C./minute. The mixture was held at about 1000° C. for about 4 hours. The furnace was then turned off and after reaching room temperature, the resulting material (MP NMC (1/1/1)) was collected, ground by hand using a mortar/pestle for 10 minutes, and then stored.

Synthesis of MP_NMC (1/1/1) with Various Li Amounts:

Following the methods disclosed above, variable amounts of starting materials (e.g. $Ni_{0.33}Mn_{0.33}Co_{0.33}(OH)_2$ and $Li_2CO_3$ (MW 73.89 g/mol) were used to prepare lithium deficient MP NMC having different molar equivalents of lithium compared to [NMC], ranging from about 0.75 to about 0.99, in $Li_{1-a}(Ni_{0.33}Mn_{0.33}Co_{0.33})O_2$. See to Table 1, below

TABLE 1

Exemplary Lithium to Metal Precursor Mass Ratios and Product Molar Ratios (where metal precursor material is $Ni_{0.33}Mn_{0.33}Co_{0.33}(OH)_2$ and lithium salt is $Li_2CO_3$)

| Metal precursor (g) | 1.48 | 1.48 | 1.48 | 1.48 | 1.48 | 1.48 | 1.48 | 1.48 | 1.48 |
|---|---|---|---|---|---|---|---|---|---|
| Lithium salt (g) | 0.595 | 0.572 | 0.546 | 0.516 | 0.486 | 0.452 | 0.422 | 0.361 | 0.30 |
| Li/[NMC] molar ratio | 0.99 | 0.95 | 0.90 | 0.85 | 0.80 | 0.75 | 0.70 | 0.60 | 0.50 |

Synthesis of MP_NMC with Varying Ratios of Nickel, Manganese, and Cobalt:

Variable molar equivalents of the Ni, Mn, and Co precursors disclosed above were selected to prepare a nickel-manganese-cobalt precursor, which was combined with a lithium salt. Consistent with the methods described above, each reaction mixture was put in an electric furnace, which was heated at a rate that was varied ±1° C./minute up to a sintering temperature generally tuned to the ratios of Ni, Co and Mn. For $Li_{1-a}(Ni_{0.5}Mn_{0.3}Co_{0.2})O_2$ the reaction mixture was heated up to about 900° C. at a rate of between 3° C./min and about 6° C./minute and then held at about 900° C. for between about 3 hours and about 6 hours. For $Li_{1-a}(Ni_{0.6}Mn_{0.2}Co_{0.2})O_2$, the reaction mixture was heated up to about 850° C. at a rate of between 3° C./min and about 6° C./minute and then held at about 850° C. for between about 3 hours and about 6 hours. For $Li_{1-a}(Ni_{0.7}Mn_{0.2}Co_{0.1})O_2$, the reaction mixture was heated up to between about 850° C. and about 800° C. at a rate of between 3° C./min and about 6° C./minute and then held at between about 850° C. and about 800° C. for between about 3 hours and about 6 hours. For $Li_{1-a}(Ni_{0.8}Mn_{0.1}Co_{0.1})O_2$, the reaction mixture was heated up to about 800° C. at a rate of between 3° C./min and about 6° C./minute and then held at about 800° C. for between about 3 hours and about 6 hours. The furnace was then turned off and after reaching room temperature, the resulting lithium deficient multiphase material was collected, ground by hand using a mortar/pestle for 10 minutes, and stored. These methods yielded lithium deficient multiphase compositions having the following general formulas:

$$Li_{1-a}(Ni_{0.5}Mn_{0.3}Co_{0.2})O_2$$

$$Li_{1-a}(Ni_{0.6}Mn_{0.2}Co_{0.2})O_2$$

$$Li_{1-a}(Ni_{0.7}Mn_{0.2}Co_{0.1})O_2$$

$$Li_{1-a}(Ni_{0.8}Mn_{0.1}Co_{0.1})O_2$$

where a ranged from about 0.01 to about 0.25.

Synthesis of Manganese-Aluminum-containing MP Cathode Materials:

Generally, targeted stoichiometric amounts of $Co(OH)_2$, $Ni(OH)_2$ and "M", typically manganese as $Mn_3O_4$, $\gamma$-$MnO_2$ or $MnO_2$ and aluminum as $Al_2O_3$ are dissolved in distilled water. The resulting metal precursor material, nickel-cobalt-manganese-aluminum hydroxide, is collected after mixing the starting material solutions and drying the reaction mixture at about 300° C. for about 5 hr. The precursor material is mixed with targeted stoichiometric amounts of a lithium salt, such as $Li_2CO_3$ or LiOH, and the mixture shaken for 10 minutes. The mixture is put in an electric furnace, which is heated to between about 800° C. and about 1000° C. at a rate of between about 2° C./min and about 10° C./min with a controlled variation of ±1° C. per minute. The mixture is held at between about 800° C. and about 1000° C. for between about 2 hours and about 8 hours. The furnace is then turned off and the sample permitted to cool inside the furnace. After reaching room temperature, the resulting MP lithium deficient material, is collected, ground by hand using a mortar/pestle for 10 minutes, and then stored.

Alternately, the manganese oxide and/or the aluminum oxide can be replaced with a metal oxide selected from the group of manganese oxide, aluminum oxide, magnesium oxide, vanadium oxide, copper oxide, zinc oxide, zirconium oxide, gallium oxide, iron oxide, titanium dioxide, chromium oxide, tin oxide, strontium oxide, phosphorous oxide, germanium oxide, indium oxide, chromium oxide and combinations thereof and/or replaced with a metal hydroxide selected from the group of manganese hydroxide, aluminum hydroxide, magnesium hydroxide, vanadium hydroxide, copper hydroxide, zinc hydroxide, zirconium hydroxide, gallium hydroxide, iron hydroxide, titanium hydroxide, chromium hydroxide, tin hydroxide, strontium hydroxide, phosphorous hydroxide, germanium hydroxide, indium hydroxide, chromium hydroxide to prepare $Li_{1-a}[Ni_xCo_yM_z]O_2$, where M is one or more elements selected from the group comprising Mn, Al, Mg, V, Cu, Zn, B, Zr, Ga, Fe, Ti, Cr, Sn, Sr, P, Ge, In, Cr and combinations thereof.

Synthesis of MP_NMC-G:

The $Ni_xMn_yCo_z(OH)_2$ precursor is thoroughly mixed with $Li_2CO_3$ and a halide salt, such as LiF, e.g. at about 1 wt % according to the targeted stoichiometric ratios. The reaction mixture is then annealed in air at between about 300° C. and about 450° C. for between about 3 hours and about 6 hours, followed by calcining in a furnace, heated at a rate of between about 3° C./minute and about 6° C./minute to a temperature of between about 700° C. and about 1000° C. The mixture is held at a temperature of between about 700° C. and about 1000° C. for between about 5 hour and about 10 hours, before turning off the furnace and being allowed to cool to room temperature.

Example 2

Characterization of Multiphase Lithium Deficient Cathode Active Materials

General Characterization of MP NMC:

The structural properties of the lithium deficient MP NMC compositions were evaluated using Inductively Coupled Plasma Optical Emission Spectrometry (ICP-OES) and Energy Dispersive X-ray spectrometry (EDX). For direct comparison, lithium deficient MP NMC (1/1/1/) of the presently disclosed subject matter was compared to commercial NMC material (SL_NMC (1/1/1)), Umicore, Cheonan, South Korea). See Table 2 for molar ratios determined by ICP-OES.

TABLE 2

ICP-OES analysis for direct comparison of SL_NMC (1/1/1) and MP_NMC (1/1/1) samples

| Material | Li | Ni | Co | Mn | O | Total metal | Li/Metal |
|---|---|---|---|---|---|---|---|
| SL_NMC(1/1/1) | 1.078 | 0.355 | 0.338 | 0.370 | 1.964 | 1.063 | 1.013 |
| MP_NMC(1/1/1) | 1.043 | 0.357 | 0.338 | 0.375 | 2.408 | 1.070 | 0.975 |

Figure 3A:
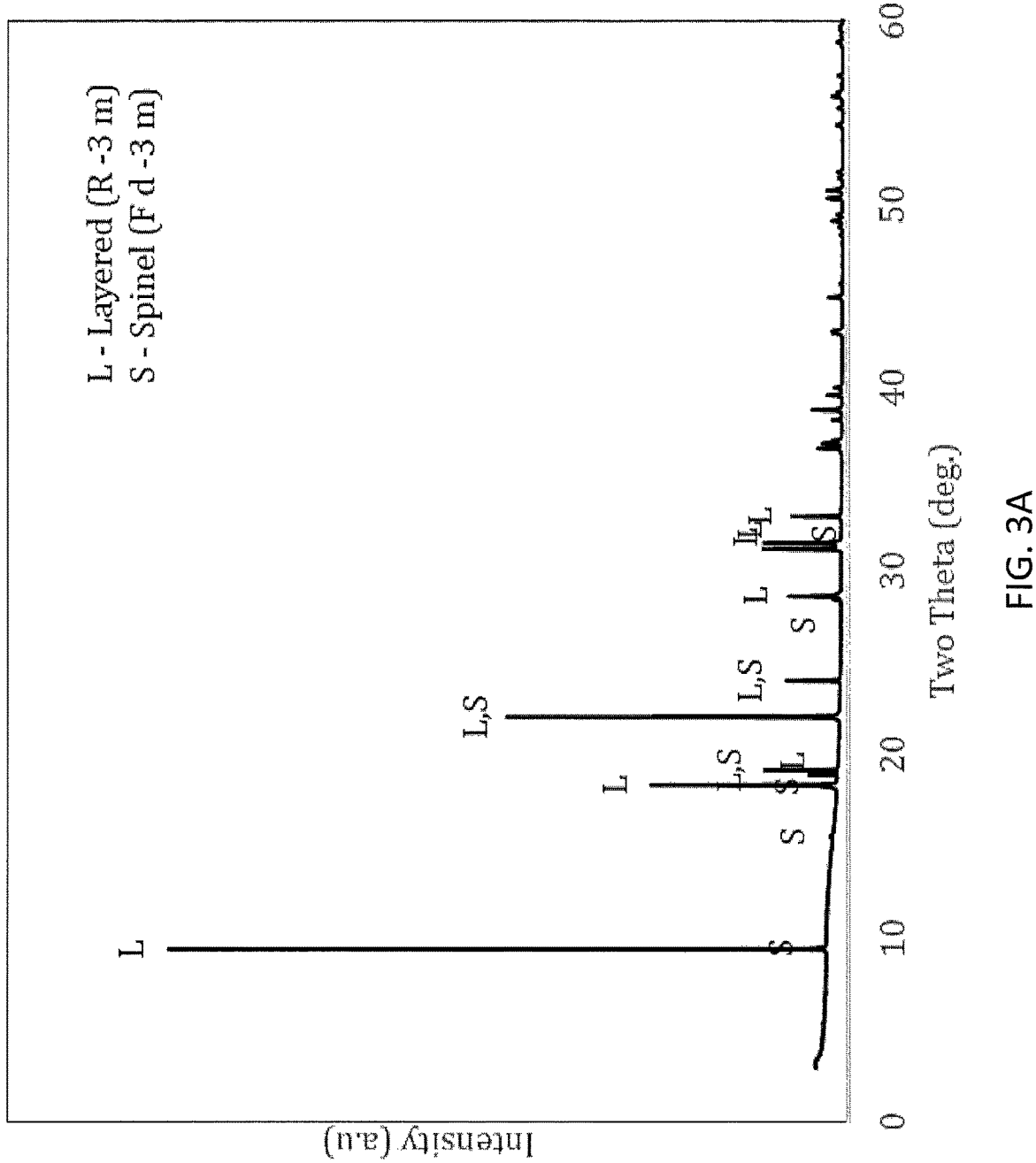
FIG. 3A is a graph of X-ray diffraction data of a multiphase lithium deficient cathode material of the presently disclosed subject matter having a formula: $Li_{0.96}Ni_{0.33}Mn_{0.33}Co_{0.33}O_2$, having both layered ("L") (space group, R-3m) and spinel ("S") (space group, Fd-3m) phase structures.
Figure 3B:
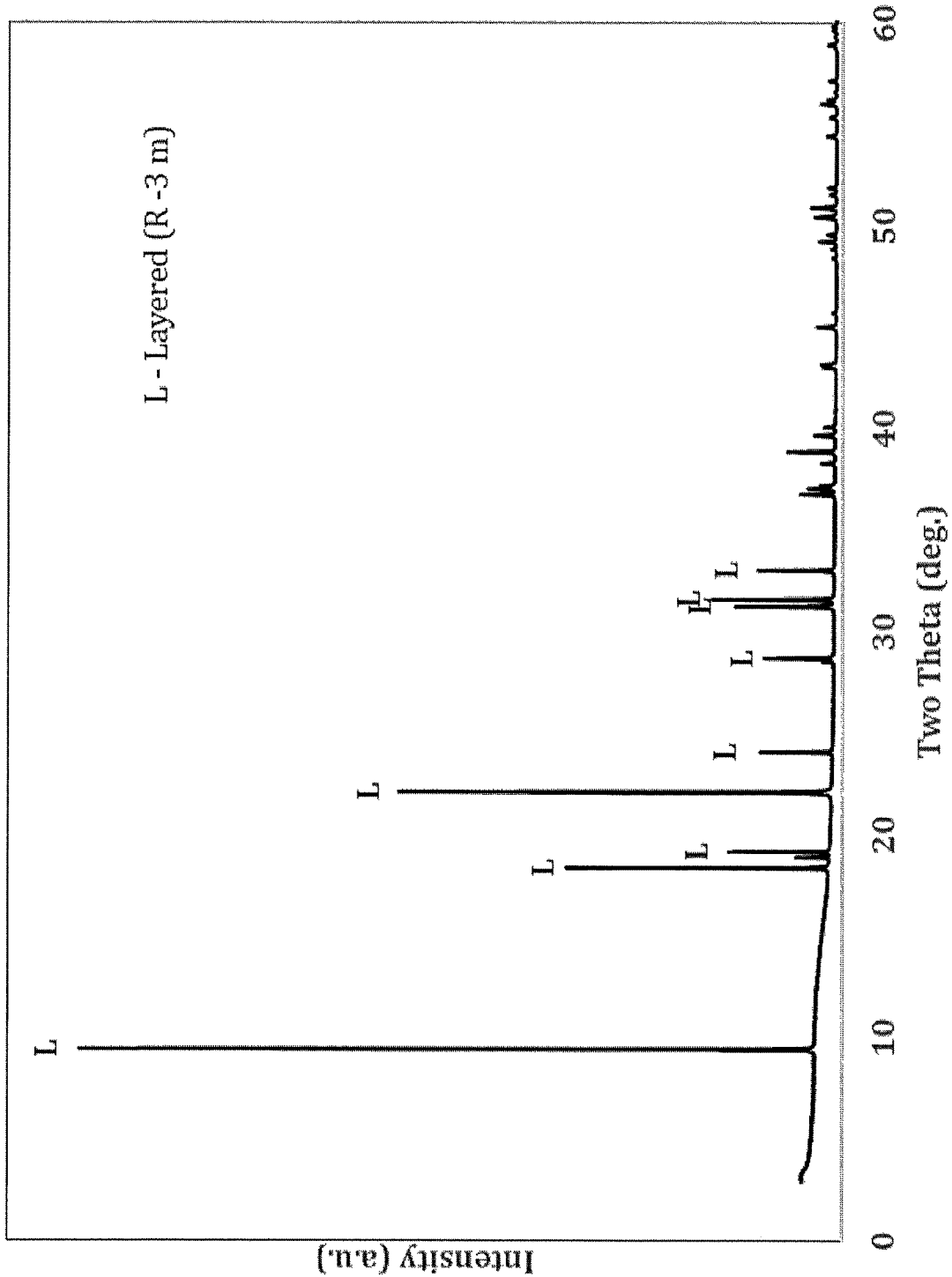
FIG. 3B is a graph of X-ray diffraction data of a cathode material having a formula: $Li_{1.08}Ni_{0.33}Mn_{0.33}Co_{0.33}O_2$, having a layered phase structure ("L").

In evaluating the X-Ray Diffraction pattern for a lithium deficient MP NMC(1/1/1) of the present composition, Le Bail fitting was employed and all peaks were indexed by using a hexagonal phase with R-3m space group and a secondary spinel phase with Fd-3m space group. FIG. 3A shows the data for the MP NMC(1/1/1) of the presently disclosed subject matter (where $R_{WP}$ was 6.86%) and FIG. 3B shows the data for SL NMC(1/1/1) (where $R_{WP}$ was 7.27%). This fitting leads to the evaluation of accurate lattice parameter information of a multiphase lithium deficient material of the presently disclosed subject matter.

For the hexagonal phase in a lithium deficient MP NMC (1/1/1), a=2.8683(1) angstrom (Å) and c=14.2739(4) Å, while the corresponding peaks for SL NMC(1/1/1) are found at a=2.8641(1) Å and c=14.2592(1) Å. Thus, the hexagonal phase in the lithium deficient MP NMC (1/1/1) sample had a larger lattice parameter than that of SL NMC(1/1/1). This correlates with the fact that a lithium deficient MP NMC has a secondary spinel phase having a relatively small lattice parameter (a=8.1430(1) Å).

Electrochemical Evaluation:

The electrochemical properties of lithium deficient MP NMC(1/1/1) materials of the presently disclosed subject matter having a formula of $Li_a(Ni_{0.33}Mn_{0.33}CO_{0.33})O_2$, where a ranged from about 0.01 to about 0.5 and more typically from about 0.01 and about 0.2, were compared to commercial NMC material (SL_NMC (1/1/1)) by incorporation into cathodes and testing.

In preparing each cathode slurry, the mass ratio of active material, polyvinylidene fluoride (PVDF) binder (Solef® 6020, Solvay, Cranbury, N.J., United States of America) and TIMREX® SFG6 Primary Synthetic Graphite (Timcal, Bironico, Switzerland) was kept at 8:1:1. The mixture was dispersed in 2 mL N-Methyl-2-pyrrolidone (NMP) and the resulting slurry was coated on aluminum foil. The slurry was dried overnight at 120° C. under vacuum.

The MP NMC (1/1/1) and SL NMC (1/1/1) samples were each used as the cathode in preparation of a CR2032 coin-type full cell (MTI Corporation, Richmond, Calif., United States of America) in an Argon filled glovebox. The CR2032 coin-type cells, which generally have a round cell with a 19.9±0.1 mm diameter and 3.1±0.1 mm height, comprised a graphite anode, 12 mg of BTR graphite (BTR New Energy Materials Inc., Shenzhen, China), a polypropylene separator (Celgard 2500, 25 μm thickness, Celgard, Charlotte, N.C., United States of America), and an electrolyte (1M $LiPF_6$ in ethylene carbonate:diethyl carbonate (1:1 vol. %), also known as "EC/DEC (1:1)").

Coin cells built with SL NMC (1/1/1) and MP NMC (1/1/1) were placed in a battery cycler (TOYO TOSCAT 3100, Toyo System USA, Columbus, Ohio, United States of America) for formation and cycling testing. During the formation step, the coin cells were each put under a constant current of C/6, followed by tapering down to C/60 in constant voltage at 4.5 V; discharge was at C/6 to 2.7 V. For the cycling test, each of the coin cells were put in a 1C charge-discharge cycling (2.7-4.5 V) up to 45 cycles at 25° C.

The discharge capacity of the coin cells assembled with SL_NMC (1/1/1) and MP_NMC (1/1/1) described above are shown in FIG. 12. As shown, MP_NMC (1/1/1) yielded a first cycle discharge capacity of 180 mAhg$^{-1}$ compared to 158 mAhg$^{-1}$ for SL_NMC (1/1/1). MP_NMC (1/1/1) also showed good capacity retention in this high voltage cycling. After 45 cycles, the discharge capacity of MP_NMC (1/1/1) was 166 mAhg$^{-1}$, retaining 92% of its initial discharge capacity, compared to a decrease to 146 mAhg$^{-1}$ in SL_NMC (1/1/1). FIG. 13 shows the cycle curve for each of SL_NMC (1/1/1) and MP_NMC (1/1/1). The discharge capacity of MP_NMC (1/1/1) decreased similarly to that of the SL_NMC (1/1/1), while at the same time keeping the discharge capacity higher than that of SL_NMC (1/1/1).

Figure 7:
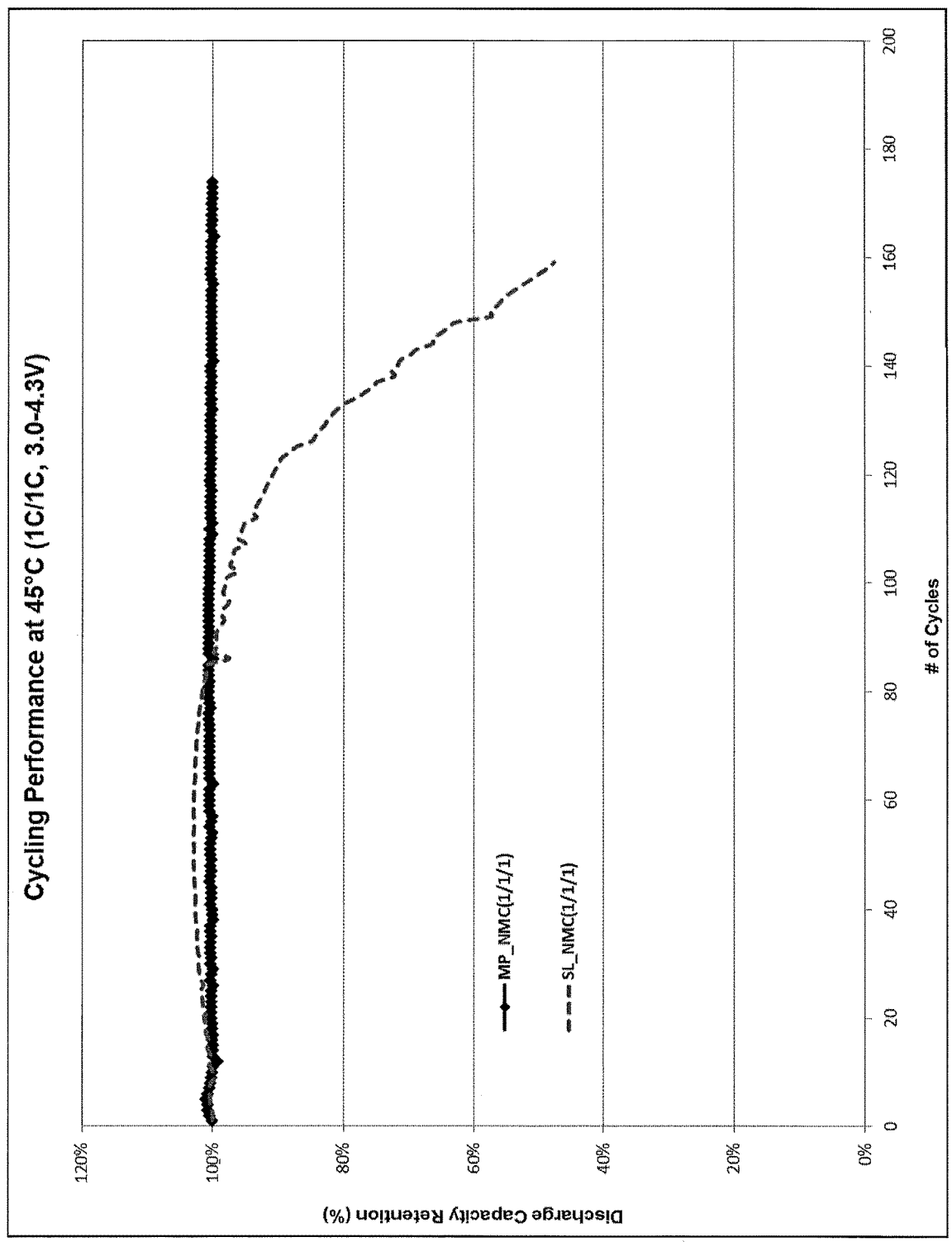
FIG. 7 is a graph of cycle performance for a lithium deficient multiphase cathode material of the presently disclosed subject matter (MP_NMC (1/1/1); solid line with diamonds) and a layered structure cathode material (SL_(1/1/1); dashed line) at 3.0 Volts (V)-4.3V versus Li$^+$/Li at 45 degrees Celsius (° C.) by applying a constant rate of 1C-rate during charge and discharge.
Figure 8:
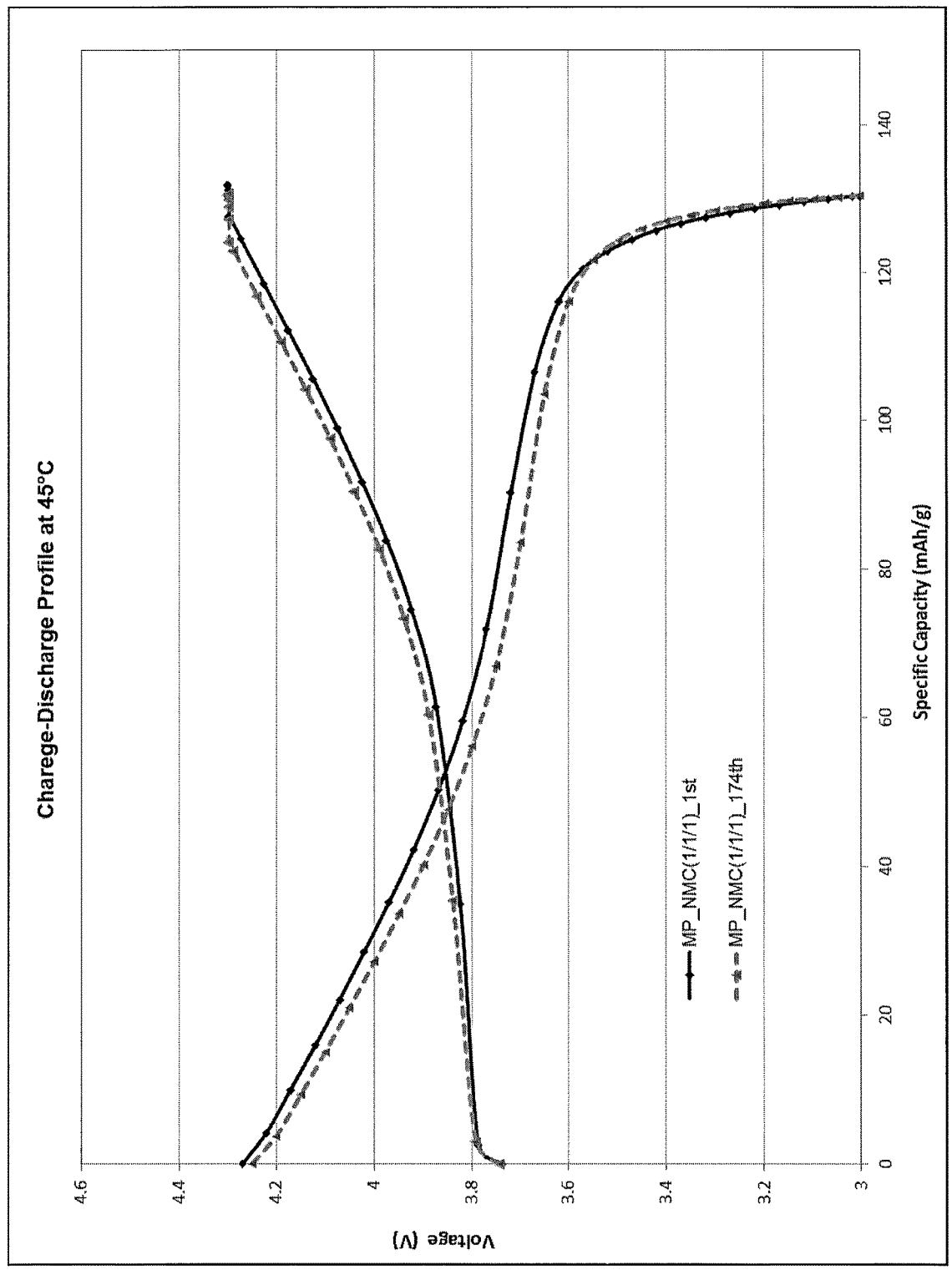
FIG. 8 is a graph of the first (1$^{st}$; solid line with diamonds) and the one hundred seventy-fourth (174$^{th}$; dashed line with triangles) charge-discharge voltage profiles (3.0 Volts (V)-4.3V) of a lithium deficient multiphase cathode material of the presently disclosed subject matter (MP-NMC(1/1/1)) at 1C-rate and 45 degrees Celsius (° C.), where the voltage hold is applied at 4.3V until C/10 current rate after each charge step.
Figure 9:
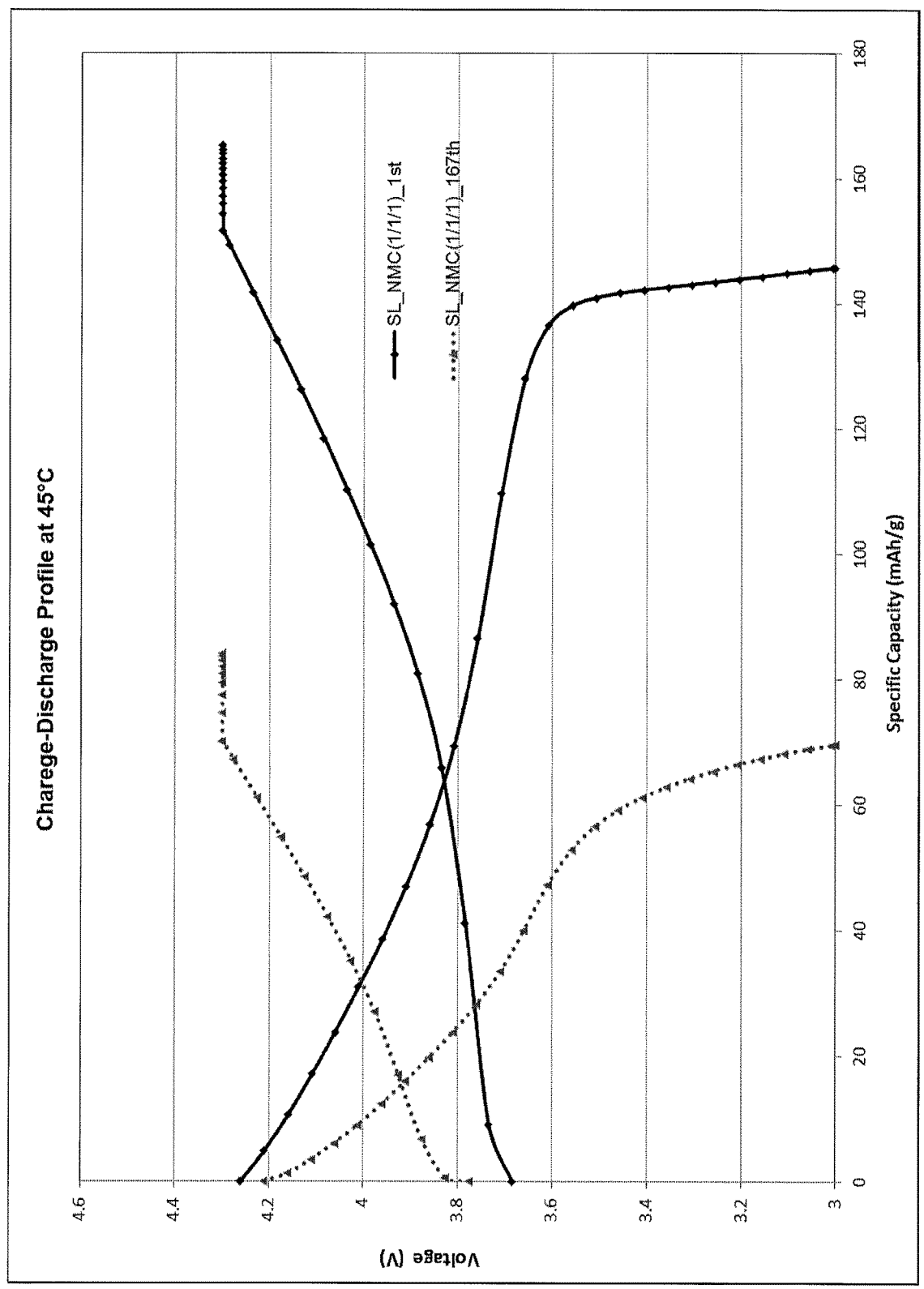
FIG. 9 is a graph of the first (1$^{st}$; solid line with diamonds) and the one hundred sixty-seventh (167$^{th}$; dotted line with triangles) charge-discharge voltage profiles (3.0 Volt (V)-

As shown in FIG. 7, MP NMC(1/1/1) showed superior cycling ability at 45° C. over 174 cycles at 1C/1C rate. No capacity fading was observed and almost no material degradation during cycling, as was confirmed experimentally. See FIG. 8. SL NMC(1/1/1) on the other hand, showed about 50% capacity loss and a huge irreversible potential is shown in FIG. 9.

Cycling performance at 60° C. for MP NMC (1/1/1) and SL NMC (1/1/1) are shown in FIG. 4. MP NMC(1/1/1) retained 95.7% of its original capacity while SL NMC(1/1/1) capacity dramatically reduced by 57%. Without being bound by any one theory, it is thought that side reactions on the cathode material surface causes metallic dissolution, which is accelerated at high temperature. The over-potential leads to an irreversible capacity and resistance growth. See FIG. 6. The robust lithium deficient MP NMC(1/1/1) had a significantly lower voltage decay than SL NMC (1/1/1). See FIG. 5. Without being bound to any one theory, is believed that the lower voltage decay of the lithium deficient multiphase cathode materials of the presently disclosed subject matter is due to its multiphase structure.

FIG. 11 shows the DSC profiles of delithiated cathodes in the presence of non-aqueous electrolyte after charging at 4.5V. For preparation of the delithiated samples for DSC, the MP NMC (1/1/1) and SL NMC (1/1/1) coin-type cells were fully charged at 4.5V and then were transferred to an argon-filled glove box. Under argon, the cells were opened to recover the electrode material. Three mg of scraped electrode material and 3 μl of electrolyte were hermetically sealed inside a stainless-steel high-pressure capsule. DSC curves were recorded for each sample between room temperature and 375° C. at a scan rate of 10° C. min$^{-1}$.

No heat flow was found using DSC within the temperature range 100° C.-250° C. for either sample. The DSC data show total generated exothermic heat, which is generally related to the amount of oxygen released from the material's lattice. The exothermic heat measured for the SL NMC material was 234 J/g. The heat measured for the MP NMC material was 132 J/g, about 43% lower than the SL NMC material. Thus, lithium deficient MP NMC of the presently disclosed subject matter yielded a product with significantly improved thermal stability, even though the chemical composition between MP NMC and SL NMC samples varied only in the molar ratio of lithium. Without being bound by any one theory, it is believed that the key difference between the two formulations is their respective structures. The spinel structure (Fd-3m space group) does not release significant amounts of oxygen, while the layered structure (R-3m space group) does. The better thermal stability of the multiphase structured cathode material can contribute to improved safety of a lithium ion battery.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A cathode active material for lithium-ion batteries comprising a compound having multiphase structures, wherein said compound has the formula:

$$Li_{1-a}[Ni_xCo_yM_z]O_{2-w}G_w$$

wherein M is one or more elements selected from the group consisting of Mn, Al, Mg, V, Cu, Zn, B, Zr, Ga, Fe, Ti, Cr, Sn, Sr, P, Ge, In, Cr and combinations thereof;
a is about 0.01 to about 0.5;
x is about 0.3 to about 0.8, y is about 0.1 to about 0.6, z is about 0.1 to about 0.5, and x+y+z=1.0;
w is 0 to about 0.3;
G is selected from F, Cl, and I; and
wherein said multiphase structures comprise a hexagonal structure with R-3m space group and a spinel structure with Fd-3m space group.

2. The cathode active material of claim 1, wherein w is 0 and the compound has the formula:

$$Li_{1-a}[Ni_xCo_yM_z]O_2,$$

wherein M is one or more elements selected from the group consisting of Mn, Al, Mg, V, Cu, Zn, B, Zr, Ga, Fe, Ti, Cr, Sn, Sr, P, Ge, In, Cr and combinations thereof;
a is about 0.01 to about 0.5; and
x is about 0.3 to about 0.8, y is about 0.1 to about 0.6, z is about 0.1 to about 0.5, and x+y+z=1.0.

3. The cathode active material of claim 2, where M comprises Mn, optionally in combination with one or more of the group consisting of Al, Mg, V, Cu, Zn, B, Zr, Ga, Fe, Ti, Cr, Sn, Sr, P, Ge, In, and Cr.

4. The cathode active material of claim 2, wherein a is about 0.01 to about 0.25.

5. The cathode active material of claim 3, wherein a is about 0.01 to about 0.25.

6. The cathode active material of claim 3, wherein a is about 0.11 to about 0.5.

7. The cathode active material of claim 3, wherein y is about 0.2 to about 0.6.

8. The cathode active material of claim 2, wherein:
y is about 0.1 to about 0.4; and
z is about 0.1 to about 0.4.

9. The cathode active material of claim 3, wherein:
y is about 0.1 to about 0.4; and
z is about 0.1 to about 0.4.

10. The cathode active material of claim 1, where M comprises Mn, optionally in combination with one or more of the group consisting of Al, Mg, V, Cu, Zn, B, Zr, Ga, Fe, Ti, Cr, Sn, Sr, P, Ge, In, and Cr.

11. The cathode active material of claim 10, wherein y is about 0.2 to about 0.6.

12. The cathode active material of claim 10, wherein a is about 0.01 to about 0.25.

13. The cathode active material of claim 10, wherein a is about 0.11 to about 0.5.

14. The cathode active material of claim 10, wherein:
y is about 0.1 to about 0.4; and
z is about 0.1 to about 0.4.

15. The cathode active material of claim 1, wherein a is about 0.01 to about 0.25.

16. The cathode active material of claim 1, wherein y is about 0.1 to about 0.4 and z is about 0.1 to about 0.4.

17. The cathode active material of claim 1, wherein each of x, y, and z is about 0.30 to about 0.38; w is 0; M is Mn, and a is about 0.01 to about 0.2.

18. A battery comprising:
a positive electrode containing a cathode active material of claim 1;
an electrolyte; and
a negative electrode.

19. A method of preparing a cathode active material for a lithium-ion battery, wherein said material comprises a compound having multiphase structures, the method comprising:
providing a metal-containing precursor having the formula:

$$Ni_xCo_yM_z(OH)_2$$

wherein M is one or more elements selected from the group consisting of Mn, Al, Mg, V, Cu, Zn, B, Zr, Ga, Fe, Ti, Cr, Sn, Sr, P, Ge, In, Cr and combinations thereof, each of x and y is about 0.1 to about 0.8, z is about 0.1 to about 0.5, and x+y+z=1.0;

mixing the metal-containing precursor with a lithium-containing salt, optionally $Li_2CO_3$, to provide a precursor mixture;

heating the precursor mixture to a temperature of about 800° C. to about 1000° C. at a rate of about 3° C. per minute to about 6° C. per minute to provide a heated mixture; and maintaining the heated mixture at about 800° C. to about 1000° C. for a period of time of between about 2 hours to about 10 hours, thereby providing a cathode active material having the formula:

$$Li_{1-a}[Ni_xCo_yM_z]O_2;$$

wherein a is about 0.01 to about 0.5; x, y, z, and M are as described for the metal-containing precursor; and wherein the multiphase structures comprise a hexagonal structure with R-3m space group and a spinel structure with Fd-3m space group.

20. The method of claim 19, wherein the method further comprises cooling the heated mixture to a temperature of about 20° C. to about 25° C. and grinding the cooled mixture, optionally wherein the grinding is performed manually and/or using a mortar and pestle.

21. The method of claim 19, wherein:
each of x, y, and z is about 0.30 to about 0.38;
M is Mn; and
a is about 0.01 to about 0.2.

22. A battery comprising:
a positive electrode containing a cathode active material of claim 17;
an electrolyte; and
a negative electrode.

* * * * *